(12) United States Patent
Beier et al.

(10) Patent No.: US 12,227,154 B2
(45) Date of Patent: Feb. 18, 2025

(54) ELECTROMECHANICAL BRAKE ACTUATOR AND CAM DISC

(71) Applicant: ZF CV Systems Europe BV, Brussels (BE)

(72) Inventors: Peter Beier, Wunstorf (DE); Arne Reiners, Hannover (DE); Jan Reiners, Hannover (DE); Christoph Moritz, Hannover (DE)

(73) Assignee: ZF CV Systems Europe BV, Brussels (BE)

( * ) Notice: Subject to any disclaimer, the term of this patent is extended or adjusted under 35 U.S.C. 154(b) by 493 days.

(21) Appl. No.: 17/630,983

(22) PCT Filed: Aug. 6, 2020

(86) PCT No.: PCT/EP2020/072117
§ 371 (c)(1),
(2) Date: Jan. 28, 2022

(87) PCT Pub. No.: WO2021/032494
PCT Pub. Date: Feb. 25, 2021

(65) Prior Publication Data
US 2022/0297659 A1   Sep. 22, 2022

(30) Foreign Application Priority Data
Aug. 16, 2019   (DE) ............. 10 2019 122 088.2

(51) Int. Cl.
*B60T 13/74*   (2006.01)
*F16D 55/2255*   (2006.01)
(Continued)

(52) U.S. Cl.
CPC ........ *B60T 13/743* (2013.01); *F16D 55/2255* (2013.01); *F16D 55/226* (2013.01);
(Continued)

(58) Field of Classification Search
CPC .... B60T 13/741; B60T 13/743; F16D 55/226; F16D 55/2255; F16D 65/18; F16D 65/183; F16D 2125/48; F16D 2125/50
(Continued)

(56) References Cited

U.S. PATENT DOCUMENTS 6,125,983 A   10/2000   Reed, Jr. et al.
2005/0092569 A1   5/2005   Gardiol et al.
(Continued)

FOREIGN PATENT DOCUMENTS

AT   516801 A2   8/2016
CN   105143706 A   12/2015
(Continued)

OTHER PUBLICATIONS

European Patent Office, Rijswijk, Netherlands, International Search Report of International Application No. PCT/EP2020/072117, Mailed Oct. 13, 2020, 2 pages.

*Primary Examiner* — Robert A. Siconolfi
*Assistant Examiner* — San M Aung
(74) *Attorney, Agent, or Firm* — Dickinson Wright PLLC

(57) ABSTRACT

An electromechanical brake actuator (102, 202, 302, 402) for a brake has a cam disc (108, 108', 108", 208, 308, 408) and a brake plunger (114, 214, 314) for actuating a brake lever (358). The cam disc (108, 108', 108", 208, 308, 408) and the brake plunger (114, 214, 314) have contact surfaces in contact with one another for directly transmitting a drive torque. The contact surface of the cam disc (108, 108', 108", 208, 308, 408) extends at a distance r about the pivot point D, which is defined as a function $r(\varphi)$ with a change rate $r'(\varphi)$ and depends on the angular position $\varphi$ of the cam disc (108, 108', 108", 208, 308, 408). The contact surface is configured to effect non-linear transmission between the drive torque of (Continued)

the cam disc (108, 108', 108", 208, 308, 408) and the force transmitted to the brake plunger (114, 214, 314).

18 Claims, 27 Drawing Sheets

(51) Int. Cl.
| | | |
|---|---|---|
| *F16D 55/226* | (2006.01) | |
| *F16D 65/18* | (2006.01) | |
| *F16D 121/24* | (2012.01) | |
| *F16D 125/32* | (2012.01) | |
| *F16D 125/48* | (2012.01) | |
| *F16D 125/50* | (2012.01) | |

(52) U.S. Cl.
CPC ........ *F16D 65/183* (2013.01); *F16D 2121/24* (2013.01); *F16D 2125/32* (2013.01); *F16D 2125/48* (2013.01); *F16D 2125/50* (2013.01)

(58) Field of Classification Search
USPC ....................................................... 188/72.9
See application file for complete search history.

(56) References Cited

U.S. PATENT DOCUMENTS

| | | | |
|---|---|---|---|
| 2011/0315493 A1 | 12/2011 | Stilwell et al. | |
| 2015/0377309 A1* | 12/2015 | Putz | F16D 55/225 |
| | | | 188/156 |
| 2020/0062230 A1* | 2/2020 | Henning | F16D 65/18 |

FOREIGN PATENT DOCUMENTS

| | | | | |
|---|---|---|---|---|
| CN | 109476283 A | | 3/2019 | |
| DE | 102009057330 A1 | | 6/2011 | |
| DE | 102016210757 B3 | | 6/2017 | |
| DE | 102016004489 A1 | | 10/2017 | |
| DE | 102016207253 A1 | | 11/2017 | |
| DE | 102017004436 A1 | | 11/2018 | |
| EP | 1798123 A1 | | 6/2007 | |
| EP | 3483480 A1 | * | 5/2019 | ............ B60T 13/745 |
| JP | H084807 A | | 1/1996 | |
| WO | WO-0190595 A1 | * | 11/2001 | ............ B60T 13/741 |
| WO | 2014189089 A1 | | 11/2014 | |
| WO | 2018206204 A1 | | 11/2018 | |
| WO | 2019076426 A1 | | 4/2019 | |

* cited by examiner

ELECTROMECHANICAL BRAKE ACTUATOR AND CAM DISC

TECHNICAL FIELD

The invention relates to an electromechanical brake actuator for a brake, in particular a commercial vehicle disc brake, having: an electric motor for generating a driving torque, a cam disc which is mounted so that it can move in rotation and is actively connected to the electric motor, and a brake plunger, which can move along a plunger axis, for actuating a brake lever of the brake, wherein the cam disc and the brake plunger have contact surfaces which bear against each other and slide or roll on each other for the purpose of directly transmitting the driving torque between the cam disc and the brake plunger, wherein the contact surface of the cam disc extends about the pivot point D at a radial distance r defined as a function $r(\varphi)$ with a rate of change $r'(\varphi)$ which is dependent on the angular position $\varphi$ of the cam disc, and the contact surface is configured to effect a non-linear transfer between the driving torque of the cam disc and the force transmitted to the brake plunger, wherein the radial distance $r(\varphi)$ is at its minimum for an angular position $\varphi=\varphi_{min}$ and is at its maximum for an angular position $\varphi=\varphi_{max}$.

This non-linear transfer is preferably configured such that, for example in order to overcome the play between the brake shoe or brake lining and the brake disc, large forward travel distances can be achieved with a relatively low braking force transmitted, whereas a higher braking force with a shorter forward travel of the brake plunger can be obtained in a situation which requires the application of high braking forces.

BACKGROUND

Electromechanical brake actuators are generally known in the automotive industry and in particular for commercial vehicles. For example, AT 516801 A2 proposes an electromechanical actuator with two transmission links in order to achieve sufficiently short brake actuation times and at the same time to obtain a desired braking performance by means of an electric motor which is as small and economical as possible. A coupling link, on which a tracing element is arranged, is provided on the first transmission link. The second transmission link has a lift curve. The tracing element traces the shape of the lift curve, wherein the second transmission link applies the input torque for the first transmission link and the input torques of the first transmission link result in a zero curve over the angle of rotation for different wear states of the brake lining.

Systems such as that mentioned above have the disadvantage that their structural configuration is very complex and are, on the one hand, costly in terms of manufacture and assembly and, on the other hand, difficult to maintain. The large number of components also requires a relatively large structural space for the arrangement.

DE 10 2017 004 436 A1 proposes an electromechanical brake actuator, in which a cam disc and a brake plunger have contact surfaces which bear against each other and slide or roll on each other for the purpose of directly transmitting the driving torque between the cam disc and the brake plunger. In this way, the cam disc can be used, in conjunction with the brake plunger which bears on the contact surface, to convert a rotational movement of the cam disc directly into a non-linear movement of the brake plunger.

The contact surface of the cam disc is here shaped in such a way that the brake plunger can be moved back and forth between a retracted position and a deflected position, and the cam disc can be moved back and forth between a starting position and a final position, wherein the starting position of the cam disc corresponds to the retracted position of the brake plunger and the final position of the cam disc corresponds to the deflected position of the brake plunger.

In the deflected position, the brake is fully applied. Because of the inevitable flexibility of the structure, the kinematic chain of the transmission of force is subject to mechanical elastic deformations. Mechanical energy is thus stored within the kinematic chain, for example in the brake caliper. If the final position of the cam disc is exceeded or the brake is opened in an uncontrolled fashion, for example by being wrongly activated or as a result of a failure of the electric motor, the brake plunger and its contact surface moves suddenly from the deflected position into the retracted position. At this point in time, the energy stored in the kinematic chain is fed into the brake actuator in an uncontrolled fashion. This causes the actuator to be mechanically stressed and can result in a reduction of the service life which would otherwise be possible and can adversely affect the functionality of the brake actuator.

SUMMARY

Against this background, the object of the present invention is to provide an electromechanical brake actuator which as far as possible overcomes the above described disadvantages. The object is in particular to provide an actuator which allows fault-tolerant operation with a long service life.

The invention achieves the object on which it is based, with an actuator of the type described above, by the rate of change $r'(\varphi)$ being positive at least in certain regions in a first angular range $\varphi_{min} \leq \varphi \leq \varphi_{max}$ and the rate of change $r'(\varphi)$ being negative at least in certain regions in a second angular range $\varphi_{max} \leq \varphi \leq 360°$. The invention makes use of the recognition that the energy which is released in the event of a fault, i.e. for example when the cam disc is over-rotated beyond the angular position $\varphi=\varphi_{max}$, is gradually dissipated in the second angular range owing to friction losses. Damage to the actuator is thus prevented.

There is at least one angular range between $\varphi_{max}$ and $\varphi_{min}$ in which a defined negative slope ensures a controlled decrease in r such that a jump from $r_{max}$ to $r_{min}$ is prevented.

The invention primarily relates to disc brakes, wherein in a disc brake the counterpart corresponding to the brake lining is the brake disc. However, the invention can in principle also be used in conjunction with drum brakes.

According to a preferred embodiment, at an angular position $\varphi=\varphi_{min}$ the rate of change is $r'(\varphi_{min})=0$. The function $r(\varphi)$ thus has a saddle point or minimum at an angular position $\varphi=\varphi_{min}$.

More preferably, at an angular position $\varphi=\varphi_{min}$ the derivative of the rate of change after the angle is $r''(\varphi_{min})>0$. $r(\varphi)$ thus has a positive curvature, i.e. a curve that curves to the left.

If, at an angular position $\varphi=\varphi_{min}$, the derivative of the rate of change is $r'(\varphi_{min})=0$ and the function $r(\varphi)$ has a positive curvature at this angular position, the function $r(\varphi)$ at the angular position $\varphi=\varphi_{min}$ has a low point. Beginning from this starting angular position $\varphi_{min}$, the radial distance thus increases at least in some sections. The minimum radial distance $r_{min}$ which is achieved at the angular position $\varphi=\varphi_{min}$ thus defines the withdrawn position of the plunger.

More preferably, at an angular position $\varphi=\varphi_{max}$ the rate of change is $r'(\varphi_{max})=0$. The function $r(\varphi)$ thus has a saddle point or maximum at an angular position $\varphi=\varphi_{max}$.

At an angular position $\varphi=\varphi_{max}$ the rate of change is preferably $r''(\varphi_{max})<0$. $r(\varphi)$ thus has a negative curvature, i.e. a curve that curves to the right.

If, at an angular position $\varphi=\varphi_{max}$, the rate of change is $r'(\varphi_{max})=0$ and the function $r(\varphi)$ has a negative curvature at this angular position, not only is a saddle point defined but also a maximum of the function. In this case, the angle $\varphi_{max}$ defines the angular position at which the radial distance $r(\varphi)$ assumes a maximum value and hence the position at which the plunger is maximally deflected.

The range of movement of the plunger is thus defined by the function $r(\varphi)$ which has a minimum at $\varphi=\varphi_{min}$ and a maximum at $\varphi=\varphi_{max}$. This angular range $\varphi_{min}\leq\varphi<(P_{max}$ thus defines the range of movement within which the plunger can move from a withdrawn position into a deflected position in order to apply a braking force. This range corresponds to the intended operation of the cam disc within the brake actuator. By definition, the cam disc has a positive slope in this range.

According to a preferred embodiment, the radial distance $r(\varphi)$, at at least one angular position $\varphi=\varphi_p{}'$ with $\varphi_{max}\leq\varphi_p{}'\leq360°$, changes suddenly by a value $\Delta r$, wherein the jump is preferably $$\Delta r \leq \frac{1}{10}r(\varphi_{max}).$$

The value $\Delta r$ by which the radial distance $r(\varphi)$ changes is dependent on the diameter of the plunger in the region of the contact surface with the corresponding contact surface of the cam disc. Such a contact surface can moreover be formed on a roller unit, for example a pressure roller. The value $\Delta r$ and hence the magnitude of the jump advantageously corresponds to at least the radius of the pressure roller.

By virtue of such a jump, firstly, in the case of a malfunction of the brake actuator which, for example, results in over-rotation of the cam disc, the braking force is dissipated suddenly in a predefined range the brake after a tolerance range, here $\varphi_{max}\leq\varphi\leq360°$, is exceeded. Such a predefined jump makes it possible to rapidly reduce the stored energy and at the same time prevents excessive energy from being imparted to the brake actuator by the sudden springing back of the plunger as a consequence of the sudden reduction in the radial distance $r(\varphi)$ between the contact surfaces.

Secondly, by virtue of such a jump, in the case of a malfunction which results in rotation of the cam disc counter to the direction of rotation, over-rotation of the disc from this direction, which occurs only in the event of a fault and hence in an uncontrolled state, is prevented.

Such a sudden change is understood to mean that the rate of change is $$\lim_{\varphi \to \varphi_{p'}} r'(\varphi) \to -\infty$$

and the jump is preferably $$\Delta r \leq \frac{1}{10}r(\varphi_{max}).$$

The radial distance $r(\varphi)$ preferably rises strictly monotonically in an angular range $\varphi_{min}\leq\varphi\leq\varphi_{max}$ such that $r'(\varphi_{min}\leq\varphi\leq\varphi_{max})>0$. The radial distance $r(\varphi)$ thus increases permanently in the angular range $\varphi_{min}\leq\varphi\leq\varphi_{max}$, wherein the rate of change $r'(\varphi)$ in the whole angular range is $>0$. It is thus ensured that the plunger, which is in contact with the contact surface of the cam disc and slides or rolls on the latter, undergoes continuous forward travel until, at an angular position $\varphi=\varphi_{max}$, the radial distance $r(\varphi)$ is at its maximum and the plunger is deflected to the maximum extent.

More preferably, the radial distance $r(\varphi)$ falls strictly monotonically in an angular range $\varphi_{max}\leq\varphi\leq360°$ such that $r'(\varphi_{max}\leq\varphi\leq360°)<0$. Thus, when the angular position $\varphi=\varphi_{max}$ is exceeded, the radial distance $r(\varphi)$ is reduced continuously such that the braking force is continuously dissipated until the plunger has finally been brought into its retracted position in which $\varphi=\varphi_{min}$.

It is understood that, if for example $\varphi_{min}=0$, it is also true that $\varphi_{min}=360°$ because the rotation of the cam disc would start again once 360° has been exceeded.

According to a preferred embodiment, in the first angular range $\varphi_{min}\leq\varphi\leq\varphi_{max}$, the function $r(\varphi)$ has a first function profile $r_1(\varphi)$, wherein, in the second angular range $\varphi_m<<360°$, it has a second function profile $r_2(\varphi)$ which differs from $r_1(\varphi)$. The profile of the radial distance $r(\varphi)$ is described by a function profile $r_1(\varphi)$ depending on the angular position $\varphi$ in a first range in which the radial distance $r(\varphi)$ increases at least in some sections, and is described by a function profile $r_2(\varphi)$ in a second angular range in which the radial distance $r(\varphi)$ decreases at least in some sections. Because these function profiles are different, the function profile can thus be described suitably within the angular range and thus enables a simplified representation of the radial distance of the contact surface from the pivot point.

$r_1(\varphi)$ and $r_2(\varphi)$ preferably meet at an angular position $\varphi_{1,2}$ at which $r'_1(\varphi)$ and $r'_2(\varphi)$ are smooth and $r_1(\varphi)$ has a negative curvature, i.e. a curve which curves to the right. The function profiles $r_1(\varphi)$ and $r_2(\varphi)$ thus preferably merge into each other with no jump. By virtue of the smooth profile of the function profiles $r_1(\varphi)$ and $r_2(\varphi)$, it is moreover ensured that the function profiles meet at just one point of the angular position $\varphi_{1,2}$.

More preferably, $r_1(\varphi)$ and $r_2(\varphi)$ meet at a second angular position $\varphi_{2,1}$ at which $r'_2(\varphi_{2,1})$ and $r'_1(\varphi_{2,1})$ are likewise smooth and $r_1(\varphi)$ has a positive curvature, i.e. a curve which curves to the left. The function profile $r_2(\varphi)$ thus also merges into $r_1(\varphi)$ with no jump.

$r_1(\varphi)$ and $r_2(\varphi)$ preferably meet at at least one angular position $\varphi_{1,2}$ at which $r'_1=r'_2$. The function profiles $r_1(\varphi)$ and $r_2(\varphi)$ thus meet at the angular position with no kinks. This favors smooth travel of the plunger on the contact surface of the cam disc and hence the low-wear transmission of force. Such an angular position can be situated, for example, at a distance from the angular position $\varphi_{max}$ or $\varphi_{min}$ such that the rate of change $r_2(\varphi)$ is negative in an angular range $\varphi>\varphi_{max}$ and the function profile $r_1(\varphi)$ falls in this range such that the slope of the function profile $r_1(\varphi)$ at the angular position $\varphi_{1,2}$ is negative and corresponds to the slope $r'_2(\varphi)$ of the second function profile of $r_2(\varphi)$.

More preferably, the angular position $\varphi_{1,2}$ is a first angular position at which $r_1(\varphi)$ preferably has a negative curvature, and $r_1(\varphi)$ and $r_2(\varphi)$ moreover meet at a second angular position $\varphi_{2,1}$ at which $r'_2=r'_1$ and $r_1(\varphi)$ preferably has a positive curvature. The function profiles $r_2(\varphi)$ and $r_1(\varphi)$ thus meet at the angular position with no kinks.

According to a preferred embodiment, the function $r(\varphi)$ has a transition function $r_3(\varphi)$ which meets the first function profile $r_1(\varphi)$ at a first angular position $\varphi_{1,3}$, wherein preferably $r'_1(\varphi_{1,3})=r'_3(\varphi_{1,3})$, and which meets the second function profile $r_2(\varphi)$ at an angular position $\varphi_{3,2}$, wherein preferably $r'_2(\varphi_{3,2})=r'_3(\varphi_{3,2})$. A linear increase of the radial distance $r_1(\varphi)$ can thus, for example, be ensured in an angular range $\varphi_{min} \le \varphi \le \varphi_{max}$ which is described by the function profile $r_1(\varphi)$. A linear function profile $r_2(\varphi)$, in which the radial distance decreases linearly, can moreover be provided in a second angular range with $\varphi_{max} \le \varphi \le 360°$. Such function profiles would then be connectable with each other, in particular smoothly and with no kinks, in a simple fashion by a higher-order transition function. In such a case, the plunger, which slides or rolls on the contact surface of the cam disc, does not undergo any jerking or vibrations.

Moreover, if $r'_1(\varphi_{1,3})=r'_3(\varphi_{1,3})$ applies, the function $r(\varphi)$ is smooth and the function profile $r_1(\varphi)$ merges into the transition function $r_3(\varphi)$ with no kinks. If $r'_2(\varphi_{3,2})=r'_3(\varphi_{3,2})$ applies, the second function profile $r_2(\varphi)$ merges into the transition function with no kinks. In such a case, the plunger slides or rolls smoothly over the contact surface of the cam disc.

According to a further preferred embodiment, the transition function $r_3(\varphi)$ is a first transition function, and the function $r(\varphi)$ also has a second transition function $r_3(\varphi)'$ which meets the first function profile $r_1(\varphi)$ at a third angular position $\varphi_{3,1}$, wherein preferably $r'_1(\varphi_{3,1})=r'_3(\varphi_{1,3})'$, and which meets the second function profile $r_2(\varphi)$ at an angular position $\varphi_{2,3}$, wherein preferably $r'_2(\varphi_{2,3})=r'_3(\varphi_{2,3})$.

The rate of change is preferably $r'(\varphi_{max} \le \varphi < \varphi_p)=0$ in an angular range $\varphi_{max} \le \varphi < \varphi_p$, wherein preferably $\varphi_{max}-\varphi_p \le 0.1 \cdot (\varphi_{max}-\varphi_{min})$. A plateau or a range in which the radial distance $r(\varphi)$ is constant is thus provided in an angular range $\varphi_{max} \le \varphi < \varphi_{bp}$. By virtue of such a range following the maximum radial distance $r(\varphi_{max})$, over-rotation of the cam discs beyond the angular position $\varphi_{max}$, for example in the event of an incorrect amount of play or play which has been set within permissible tolerances, will prevent a sudden decrease in the braking force because the position of the plunger is held constant in a predefined range. The width of the plateau should accordingly be selected dependent on the specified tolerances of the play setting.

A further preferred embodiment is characterized in that the cam disc has an indentation on its periphery for defining a parking brake position, wherein the indentation is arranged between a contact point with the brake plunger in the starting position and contact point with the brake plunger in the final position. If the cam disc with its indentation is situated in such a contact position, the braking power supplied in this position and imparted by the brake plunger remains constant, even when the electrical energy is no longer being supplied to the driving electric motor. The parking brake force can be modulated by expedient positioning of the indentation. This functionality is associated with a low degree of structural complexity and is furthermore easy to maintain and mechanically reliable.

The indentation is preferably arranged in such a way that the brake plunger, when arranged in the indentation, transmits a braking force in a range of approximately 20% to approximately 50% of the maximum braking force. Parking brake functionality with a small number of components can be obtained by virtue of such a functional integration. This moreover has a positive effect on the structural space required by the device. In order to not modulate the braking force unnecessarily during normal operation and to prevent the braking force from being modulated unintentionally by a driver, this region can advantageously be placed in the region of the negative slope of the cam disc.

The object of the invention is achieved in a first aspect, as described above, by a brake actuator. The invention relates in a second aspect to a cam disc for such a brake actuator, which is configured to be connected to the driveshaft of an electric motor, wherein the cam disc has a contact surface which can be brought to bear against the contact surface of the brake plunger in order to directly transmit the driving torque between the cam disc and the brake plunger in such a way that the contact surfaces slide or roll on each other, wherein the contact surface of the cam disc runs with a radial distance r in the radial direction around the pivot point D, which is defined as a function $r(\varphi)$ with a rate of change $r'(\varphi)$ dependent on the angular position $\varphi$ of the cam disc, and the contact surface is configured in such a way that there is a non-linear transfer between the driving torque of the cam disc and the force transmitted to the brake plunger, wherein the radial distance $r(\varphi)$ is at its minimum at an angular position $\varphi=\varphi_{min}$ and is at its maximum at an angular position $\varphi=\varphi_{max}$. The invention achieves the object on which it is based in a second aspect by the rate of change $r'(\varphi)$ being positive at least in certain regions in a first angular range $\varphi_{min} \le \varphi \le \varphi_{max}$ and the rate of change $r'(\varphi)$ being negative at least in certain regions in a second angular range $\varphi_{max} \le \varphi \le 360°$. Preferred embodiments and advantages of the brake actuator according to the invention are at the same time preferred embodiments and advantages of the cam disc for such a brake actuator.

Exemplary embodiments of the invention are now described below with the aid of the drawings which are not necessarily intended to illustrate the exemplary embodiments to scale and instead, where useful for explanation, the drawings are made in a schematic and/or slightly distorted form. Reference is made to the relevant prior art with regard to supplementary information about the teachings which are immediately apparent from the drawings. It should be noted here that numerous modifications and changes relating to the form and detail of an embodiment can be made without departing from the general idea of the invention. The features of the invention disclosed in the description, in the drawings, and in the claims can be essential for the development of the invention both taken individually and in any combination. Additionally within the scope of the invention are all combinations of at least two of the features disclosed in the description, the drawings, and/or the claims. The general idea of the invention is not limited to the exact form or the detail of the preferred embodiments shown and described below and not limited to a subject which would be restricted in comparison with the subject of the claims. For the measurement ranges indicated, it is intended that the values which lie within the said limits are also disclosed as limit values and can be used and claimed as desired. For the sake of simplicity, the same reference numerals are used below for identical or similar parts or parts with an identical or similar function.

Further advantages, features, and details will become apparent from the subsequent description of the preferred embodiments and with the aid of the appended drawings.

DETAILED DESCRIPTION OF THE DRAWINGS

Figure 1:
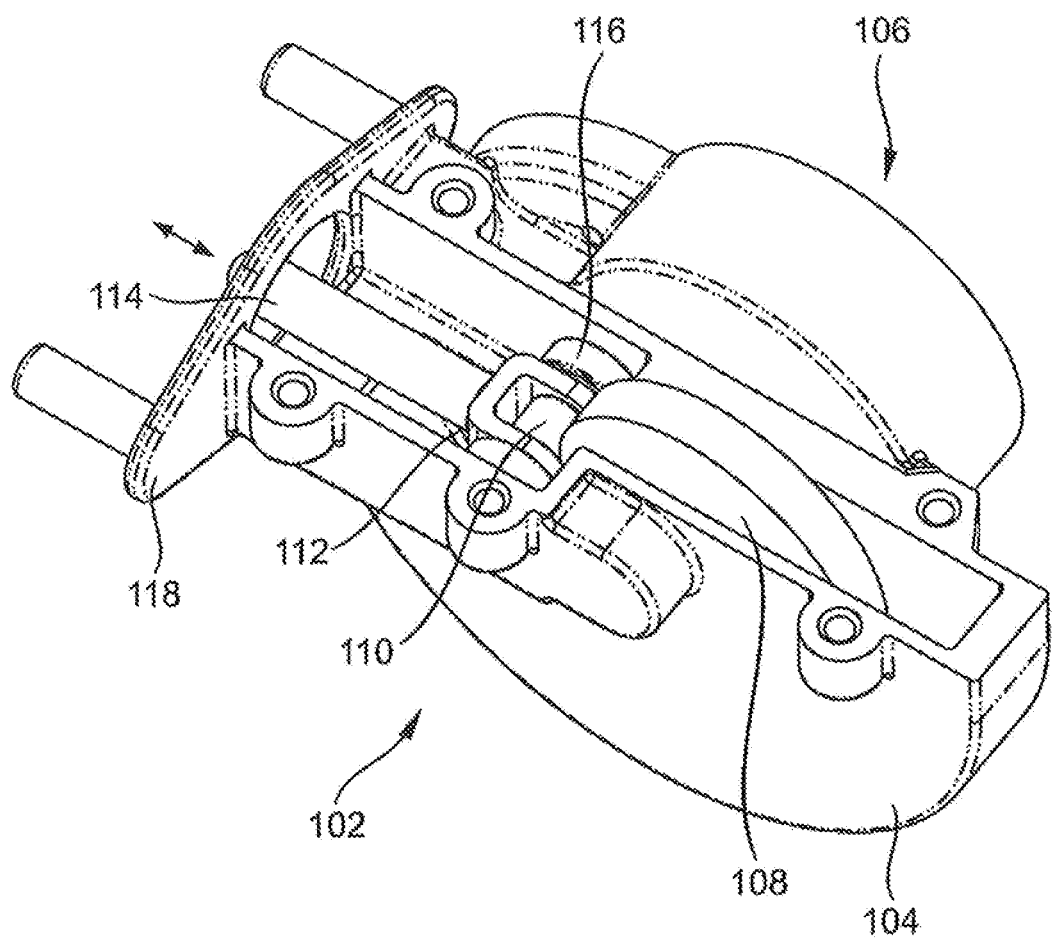
FIG. 1 shows a first exemplary embodiment of an electromechanical actuator according to the invention in a side view.

FIG. 1 shows an electromechanical actuator 102 with a housing 104. The actuator 102 has an electric motor 106. The driving torque of the electric motor 106 is transmitted to a cam disc 108 via a transmission (compare FIG. 2). The cam disc 108 serves for the non-linear transmission of the rotational movement of the cam disc 108 to a brake plunger 114.

The brake plunger 114 can in particular be deflected linearly in the illustrated direction of the arrows. The brake plunger 114 has a plunger head 112 at its end facing the cam disc 108. This plunger head 112 surrounds a rolling element 110 which is mounted by means of the bearing 116. The rolling element 110 slides on the periphery of the cam disc 108. Transmission of the rotational movement of the cam disc 108 into a linear movement of the brake plunger 114 is obtained herewith. The electromechanical actuator 102 can be connected in particular to a brake (not illustrated) via a connecting section 118.

Figure 2:
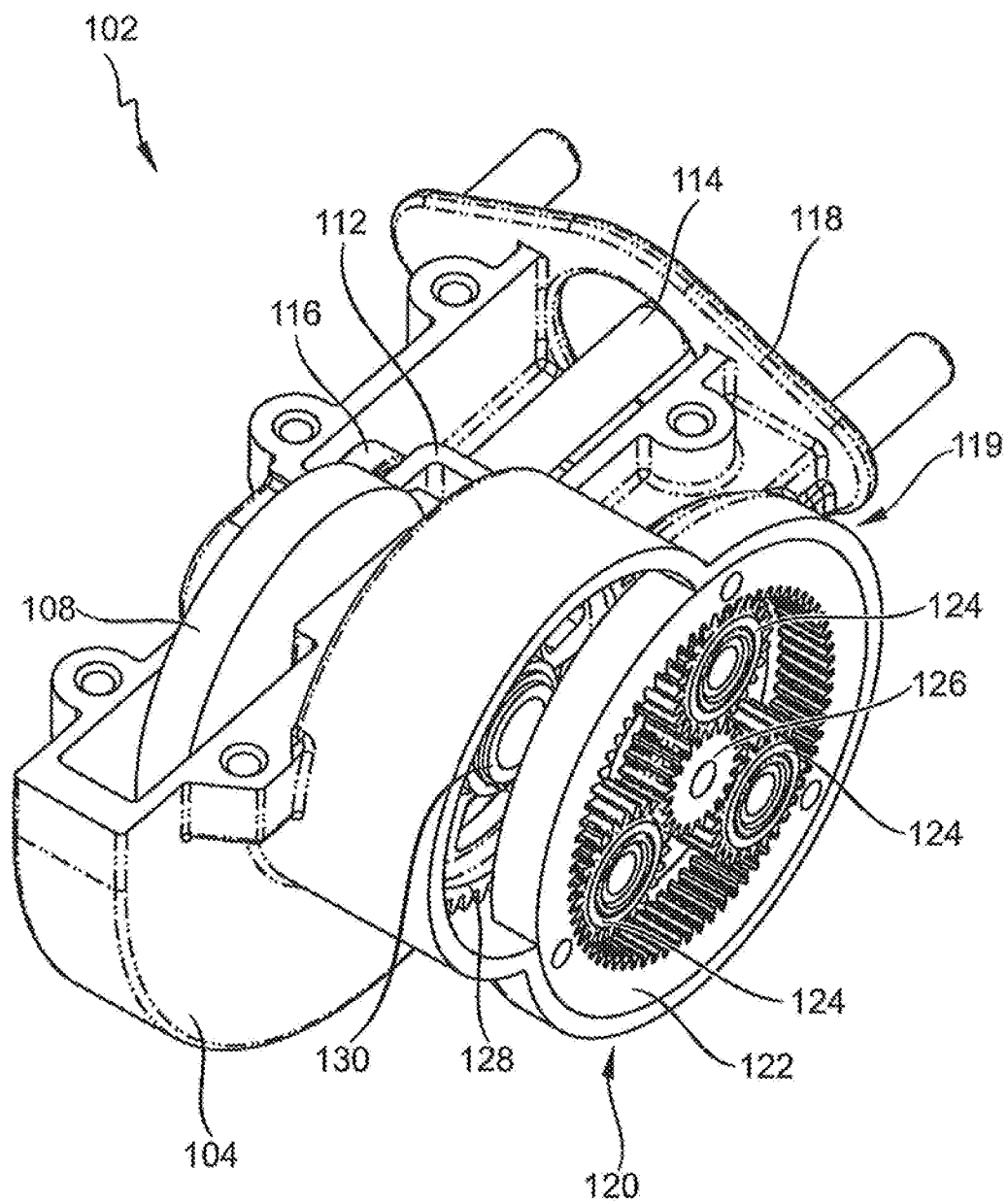
FIG. 2 shows the exemplary embodiment of the actuator according to the invention according to FIG. 1 in a further side view.

The already mentioned transmission 119 is shown in detail in FIG. 2. The transmission 119 has a two-stage configuration. The first stage of the transmission 119 is designed as an epicyclic transmission 120. The epicyclic transmission 120 has a ring gear 122, planet gears 124, and a sun gear 126. In a manner known per se, conversion of the quantities of motion of the electric motor 106 takes place in the epicyclic transmission 120. A spur gear 128 is mounted downstream from the epicyclic transmission 120. This spur gear 128 is connected to the epicyclic transmission 120 via a further spur gear (not visible). The spur gear 128 is situated on a shaft 130 to which the cam disc 108 is also attached. The driving torque is thus transmitted from the electric motor 106 via the transmission 119 and the shaft 130 to the cam disc 108. It should be understood that the transmission 119 can according to the invention in principle be arranged around the axis of rotation of the cam disc 108 over the whole 360° in order to satisfy a variety of structural space situations.

Figure 3:
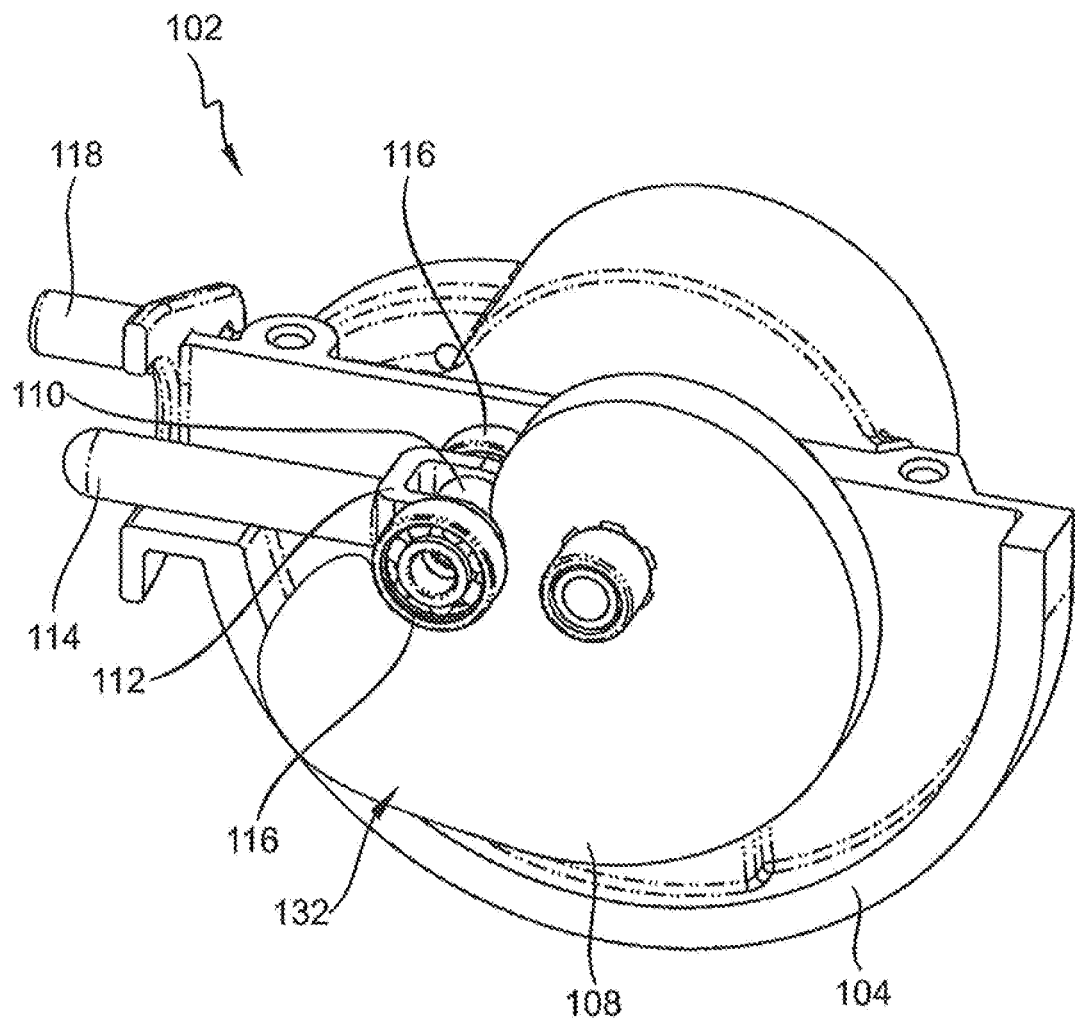
FIG. 3 shows the exemplary embodiment of the actuator according to the invention according to FIGS. 1 and 2 in a side view in partial section.

A configuration, by way of example, of the cam disc 108 can be seen in FIG. 3. As illustrated in FIG. 3, the plunger 114 is situated in a completely retracted starting position. The radial distance between the rolling element 110 of the plunger head 112 and the axis of rotation of the cam disc 108 is at its smallest here. If the cam disc 108 then rotates counterclockwise, translational movement of the brake plunger 114 takes place because of the shape of the cam disc 108. This is in particular due to the fact that, as the rotation of the cam disc 108 from the starting position increases, the contact angle between the brake plunger 114 and the cam disc 108 relative to the plunger axis becomes smaller.

This has the additional effect that a change in the angle of rotation of the cam disc 108, with such a shape of the cam disc, has the result that in a change in the angle of rotation of the cam disc 108 within a range of small deflections of the brake plunger 114 causes a larger distance to be covered on the sides of the brake plunger 114 with a smaller transmitted braking force, and wherein, in the region of the maximum deflection 114 of the brake plunger, an equivalent change in the angle of rotation of the cam disc 108 entails a smaller deflection of the brake plunger 114 with a higher transmitted braking force.

Figure 4:
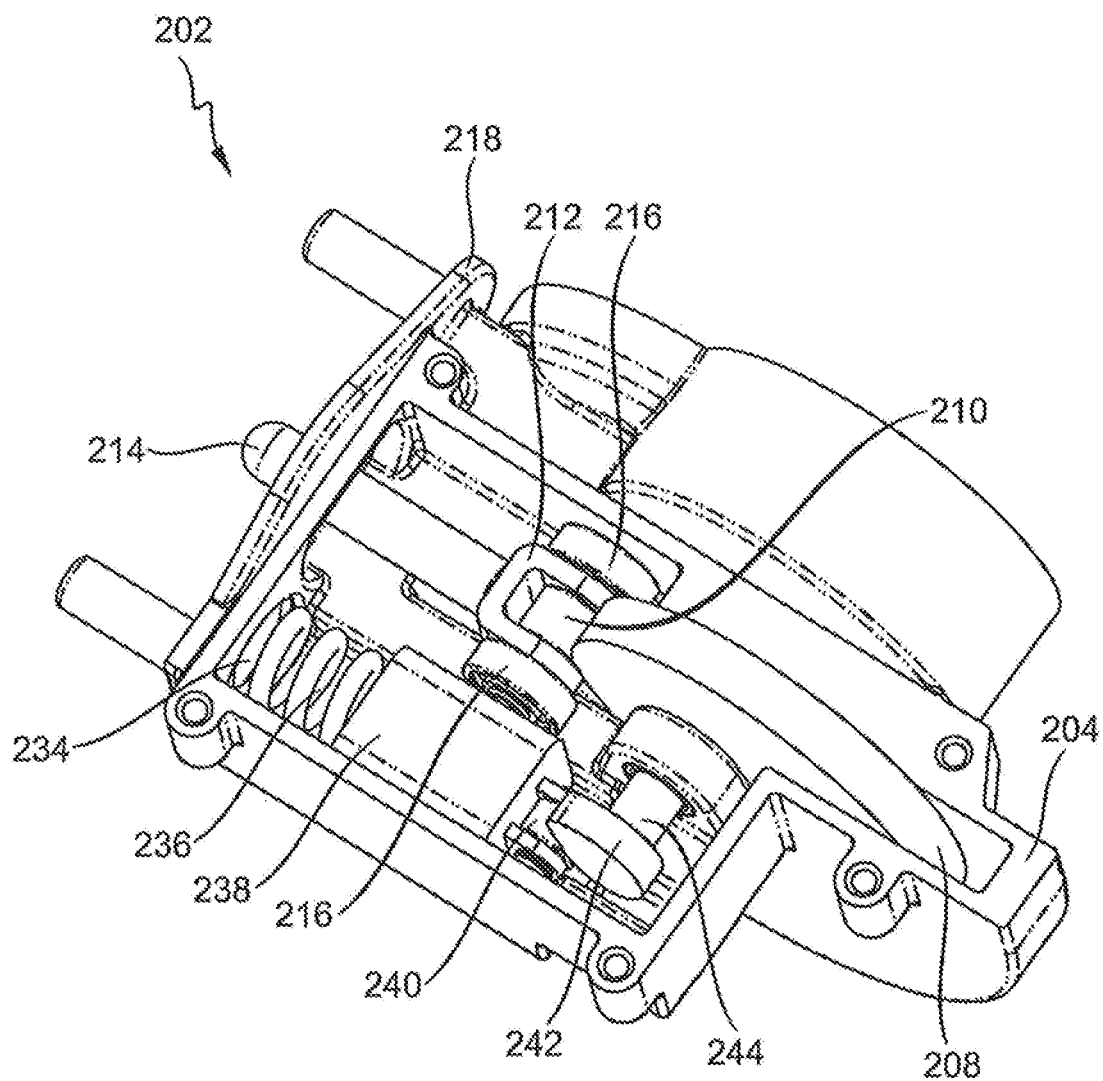
FIG. 4 shows a second exemplary embodiment of an actuator according to the invention in a plan view.

A second exemplary embodiment of the electromechanical actuator 202 is illustrated in FIG. 4. The actuator 202 again has a housing 204 and an electric motor, downstream from which a transmission is mounted (both components are not illustrated in FIG. 4). A driving torque is transmitted to the cam disc 208 in a known manner. The cam disc 208 again serves to transmit the rotational movement of the drive into a translational movement of the brake plunger 214. The brake plunger 214 has a brake plunger head 212 which surrounds a rolling element 210 which is mounted with the aid of the bearing 216. A camshaft 244 with a cam 242 is arranged on the shaft (not illustrated). The cam 242 is configured by means of the rolling element 240 and the spring guide 238 to activate a spring element 236 which is guided in a spring guide 234 and is fastened in the housing 204. It is here provided that the cam 242 compresses and hence tensions the spring element 236 and stores energy in a first range of movement, and, in a second range of movement, absorbs the energy stored in the spring element 236 and delivers it to the camshaft 244 which is coupled to the cam disc 208. The cam 244 is furthermore configured to define a locking position. Whilst a specific arrangement of the energy storage and delivery parts (cam 242, rolling element 240, spring guide 238, springe element 236, spring bearing 234) is shown in the drawings, it should be understood that these elements can according to the invention in principle be arranged freely about the axis of rotation of the cam disc 208 in order to satisfy specific structural space requirements, for example in the vehicle, as far as possible.

Figure 5:
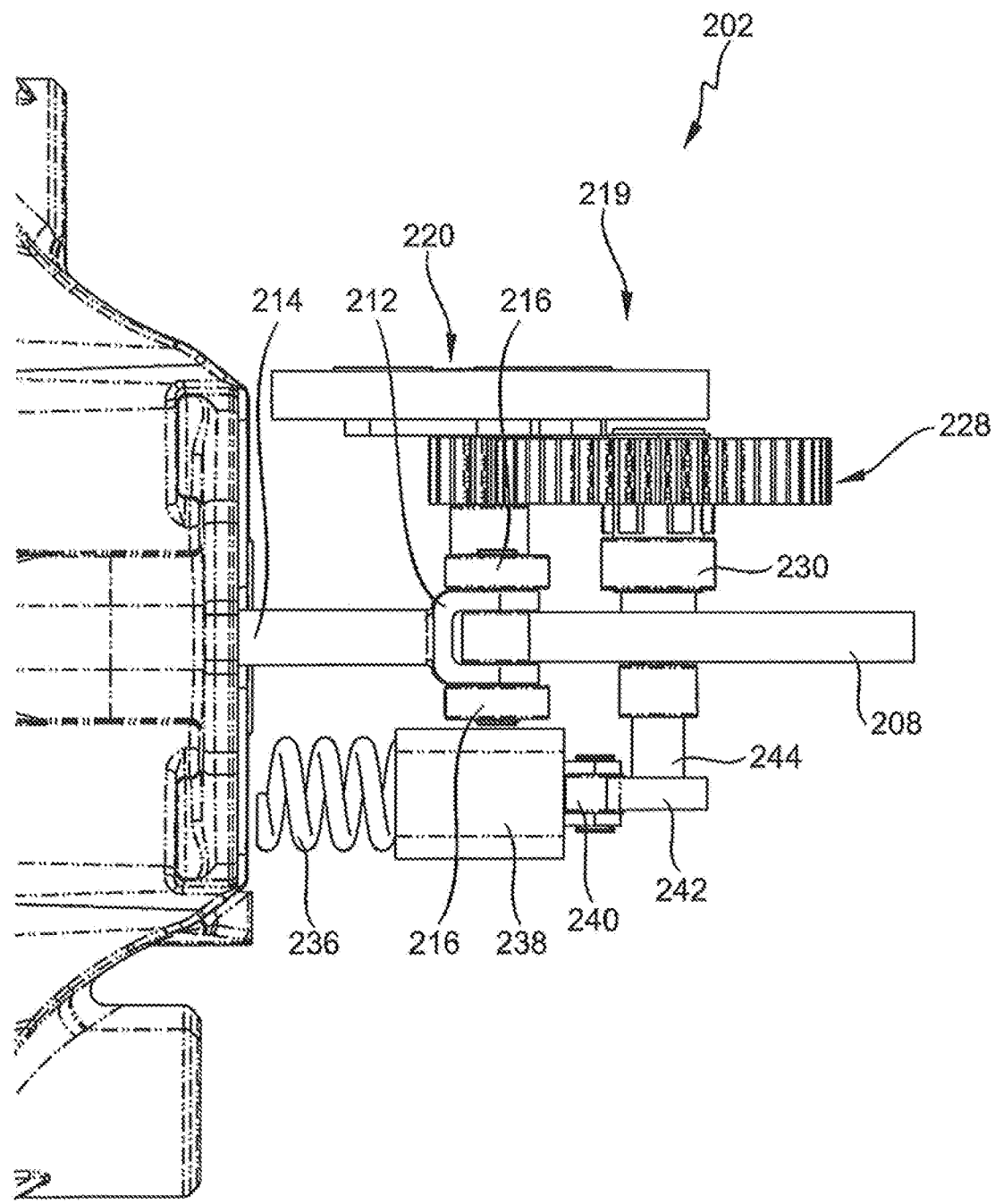
FIG. 5 shows a plan view of the actuator according to FIG. 4.

A plan view of the embodiment already known from FIG. 4 is shown in FIG. 5 without the relevant housing. The structure of the transmission 219 can now be taken from FIG. 5. The transmission 219 has the epicyclic transmission 220 as a first stage. A further speed reduction and torque increase take place in the transmission 219 by means of a spur gear 228. Connected downstream from the transmission 219 is the shaft 230 on which the cam disc 208 is fastened.

Figure 6:
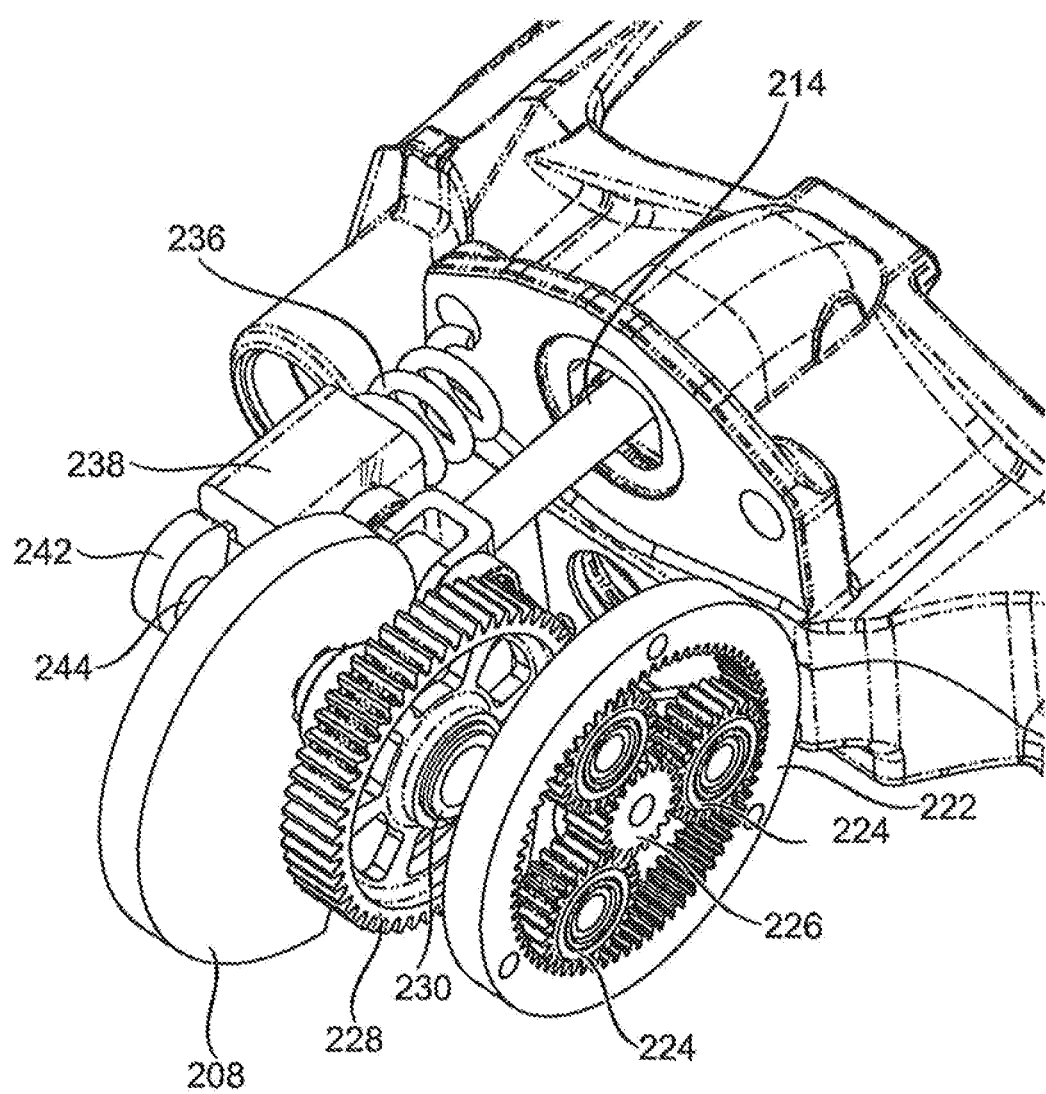
FIG. 6 shows the exemplary embodiment of the actuator according to the invention according to FIGS. 4 and 5 in a view from obliquely above, without the housing.

FIG. 6 shows a side view of the second exemplary embodiment. The structure of the epicyclic transmission 220 can in particular be taken from here. In a manner known per se, it has a ring gear 222 on which the planet gears 224 are arranged. The sun gear 226 is situated at the center of the epicyclic transmission 220.

Figure 7:
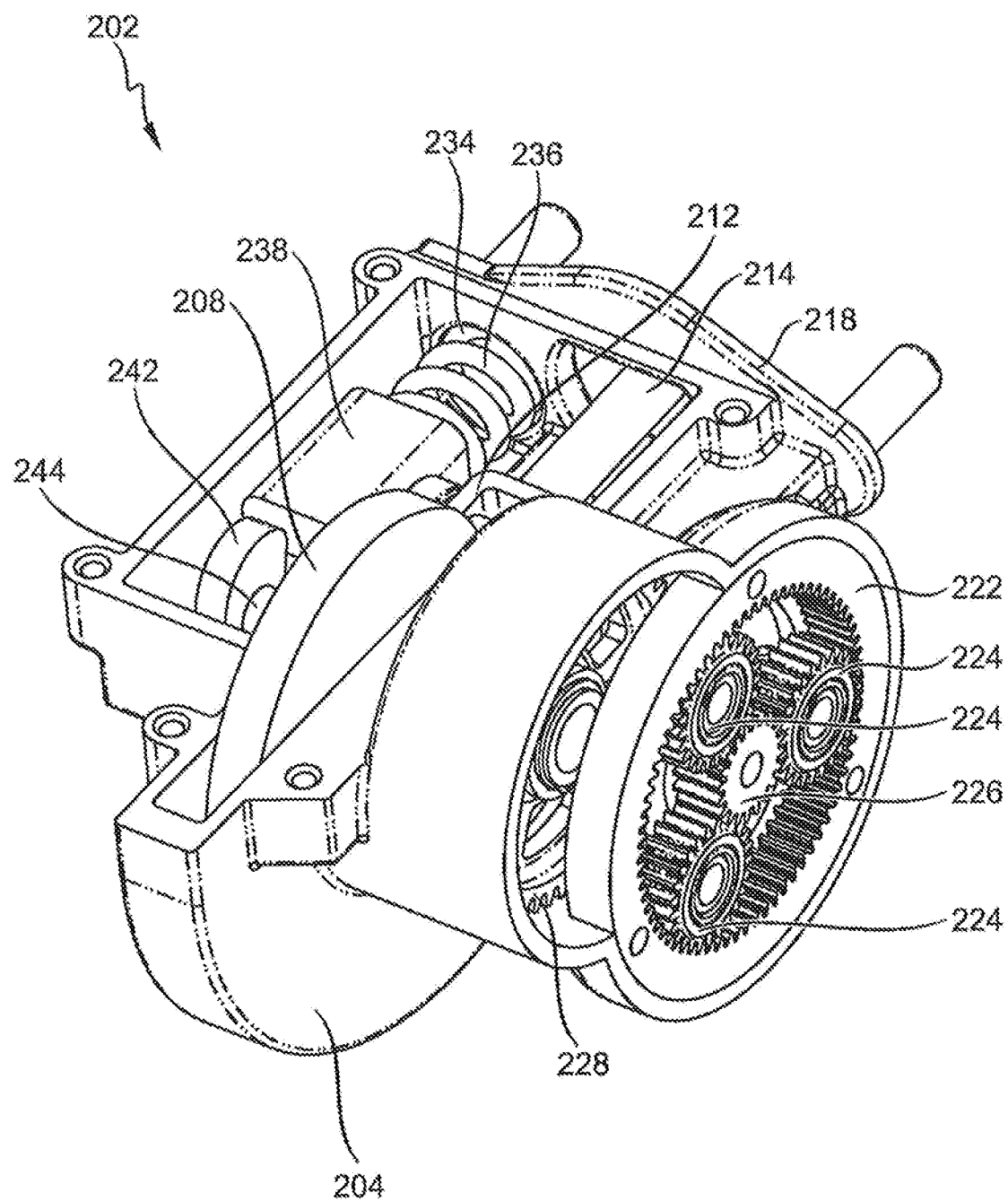
FIG. 7 shows the exemplary embodiment of the actuator according to the invention according to FIGS. 4-6 in a view from obliquely above.

FIG. 7 shows a side view of the second exemplary embodiment in a partial view in section.

Figure 8:
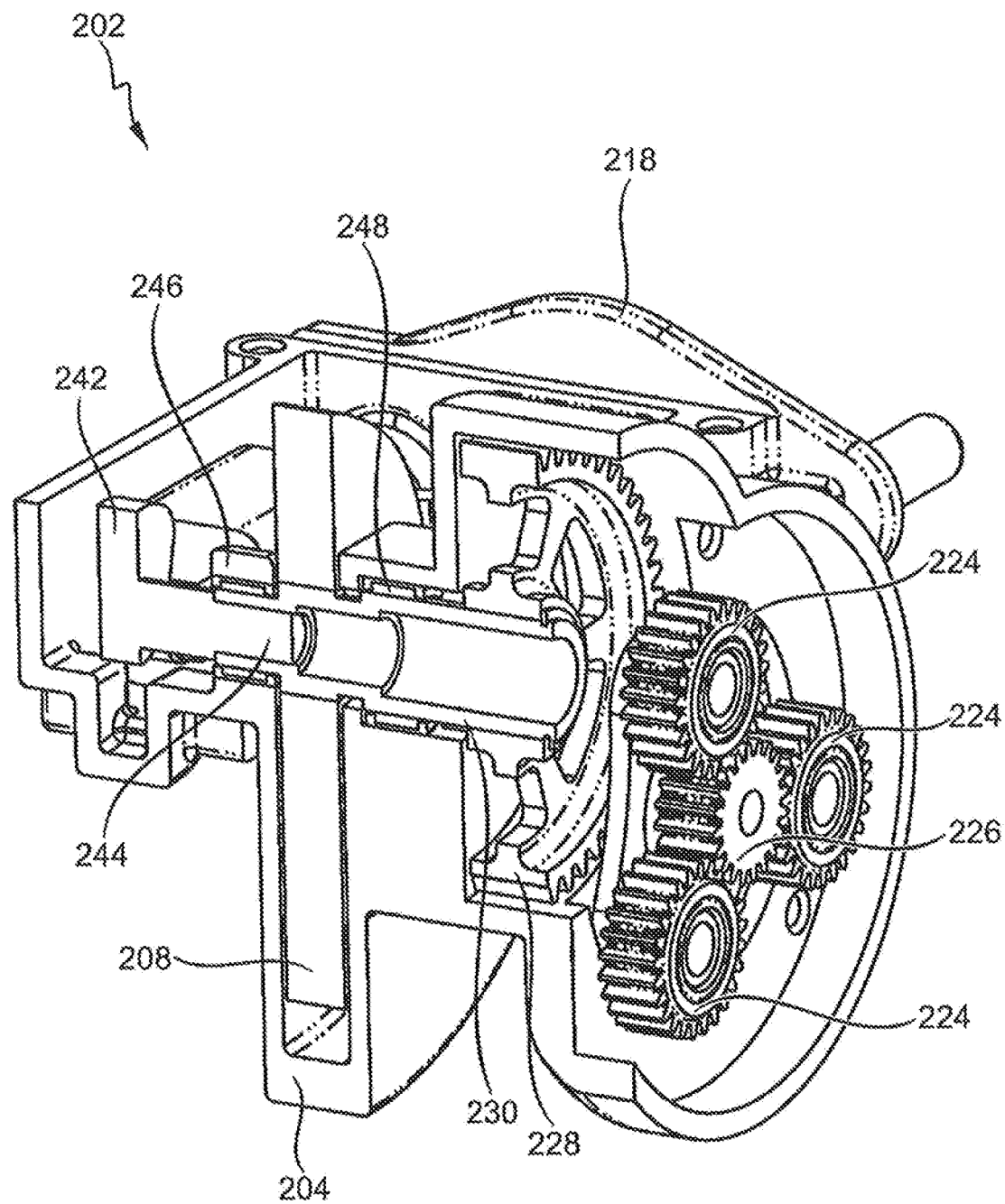
FIG. 8 shows the exemplary embodiment of the actuator according to the invention according to FIGS. 4-7 in a view in partial section.

A view in section of the actuator 202 is illustrated in FIG. 8 with a plane of section along the shaft 230. As can be seen from the Fig., the shaft 230 is not formed as the same component as the camshaft 244 but is connected thereto in particular in a force-fitting fashion.

Figure 9:
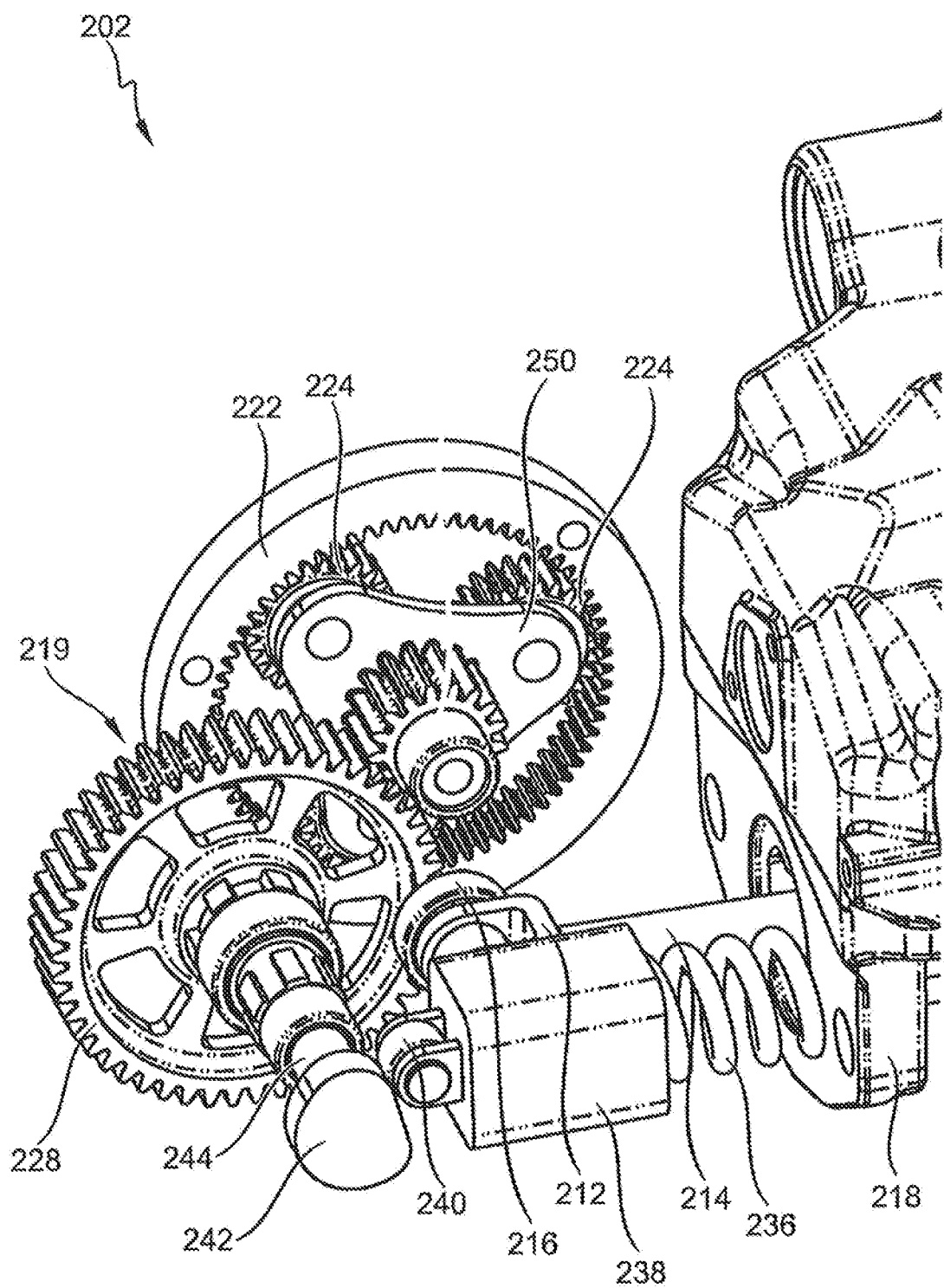
FIG. 9 shows the exemplary embodiment of the actuator according to the invention according to FIGS. 4-8 in a side view, without the housing.

The transmission 219 is exposed in FIG. 9. Supplementary to the already discussed drawings, it can be seen in FIG. 9 that the planet gears 224 are arranged on a plate 250.

Figure 10:
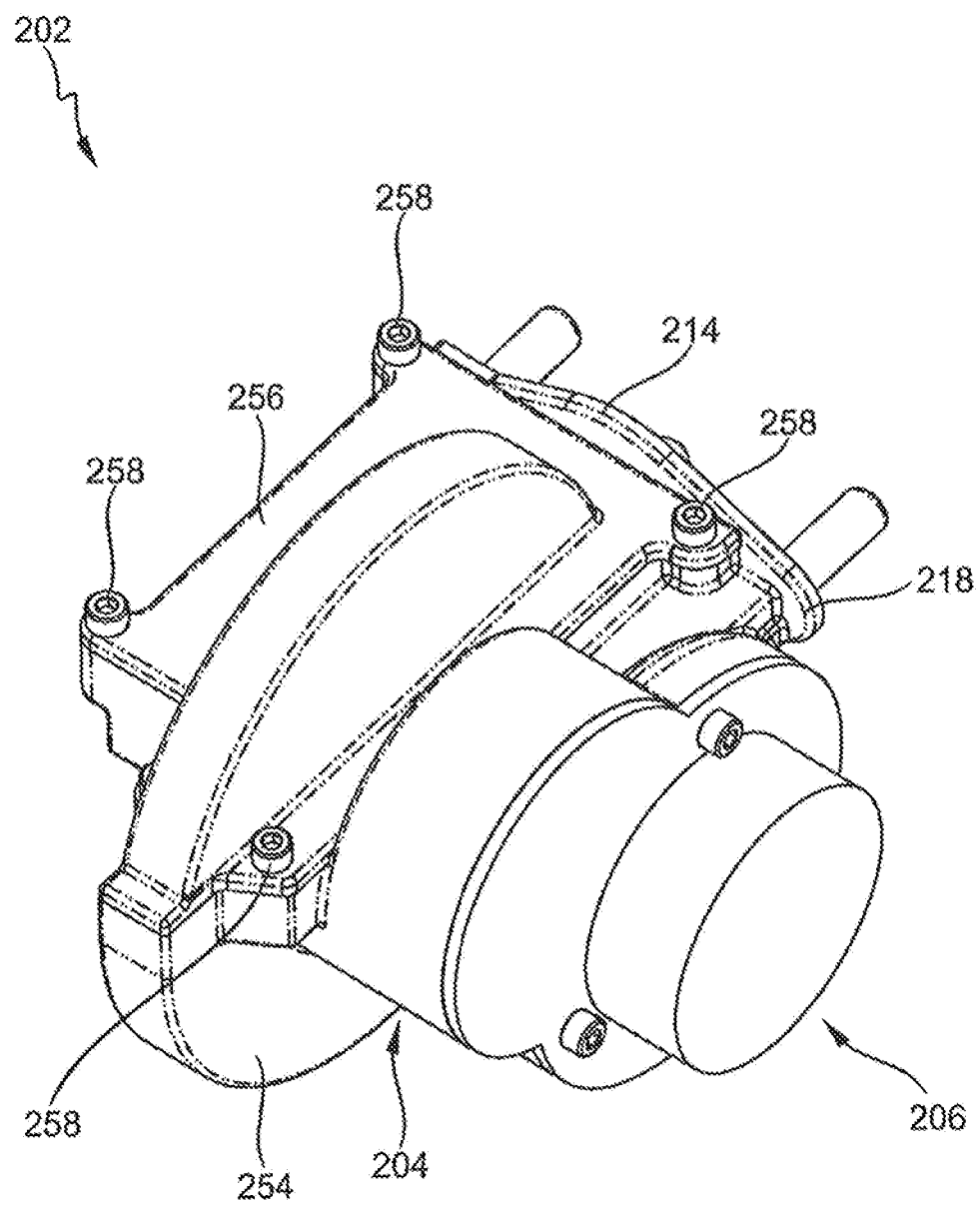
FIG. 10 shows the exemplary embodiment of the actuator according to the invention according to FIGS. 4-9 with the housing closed.

FIG. 10 shows the closed housing 204 of the electromechanical actuator 202. The housing 204 has a first housing section 254 and a second housing section 256. The housing sections 254 and 256 are connected to each other by means of the screws 258.

Figure 11:
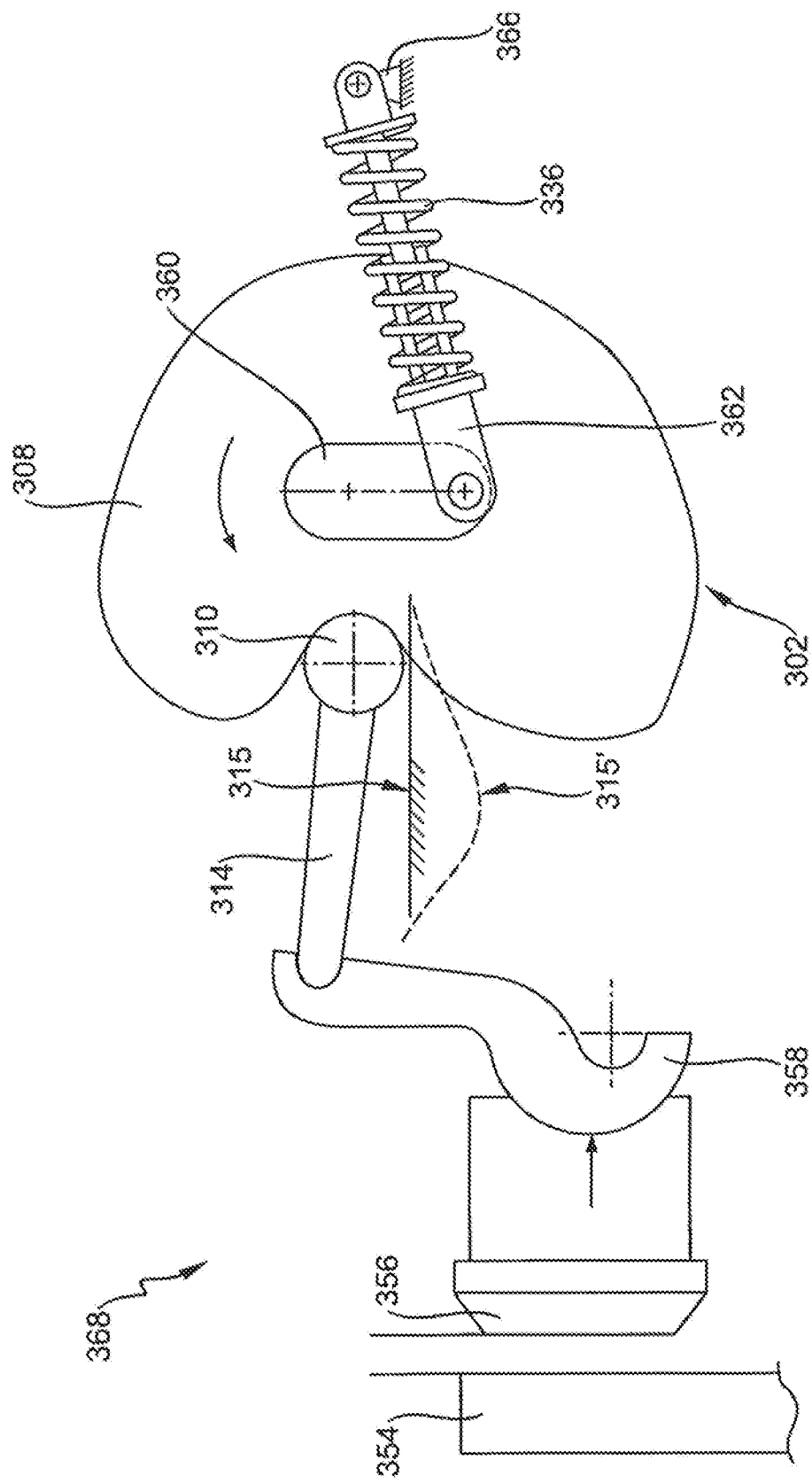
FIG. 11 shows a third exemplary embodiment of an actuator according to the invention and a disc brake according to the invention in a side view.

FIG. 11 shows a third exemplary embodiment of an actuator 302 according to the invention and of a disc brake 368 according to the invention in a side view. The operating principle of the disc brake 368 consists in a brake lining 356 being pressed against a brake disc 354 after having crossed an air gap. The friction that occurs brakes a wheel (not illustrated) connected to the brake disc 354. Alternatively, a brake actuator according to one of the remaining exemplary embodiments can be installed in the disc brake 368.

The force required for this is transmitted to the brake lining 356 via the brake lever 358. The brake lever 358 is in turn activated by the brake plunger 314. The latter is activated in a known manner by the cam disc 308.

With regard to the guidance of the brake plunger 314, two alternative brake plunger guides 315, 315' are shown. The straight brake plunger guide 315 serves to guide the brake plunger 314 (in translation) purely linearly.

Alternatively, a curved brake plunger guide 315' can be provided which enables non-linear guidance of the brake plunger 314.

The electromechanical actuator 302 illustrated in FIG. 11 furthermore has a lever 360 which is coupled to the cam disc 308. A spring head 362, which in turn is connected to a spring element 336, is fastened to the lever 360. A bearing 366 is situated at the other end of the spring element 336. The spring element 336 is again configured to deliver energy, depending on the angle of rotation of the lever 360 and hence the cam disc 308, to the spring element 336 such that the latter is compressed and stores energy. Furthermore, the spring element 336 is configured to transmit energy to the lever 360 and the cam disc 308 via the spring head 362 depending on the range of its angle of rotation. Reference is made to the above explanations with regard to the fundamental operating principle. It should be understood that the arrangement consisting of the lever 360 and the corresponding energy storage and delivery parts (spring head 362, bearing 366, spring 336) can according to the invention in principle be placed freely around the cam disc 308.

Figure 12:
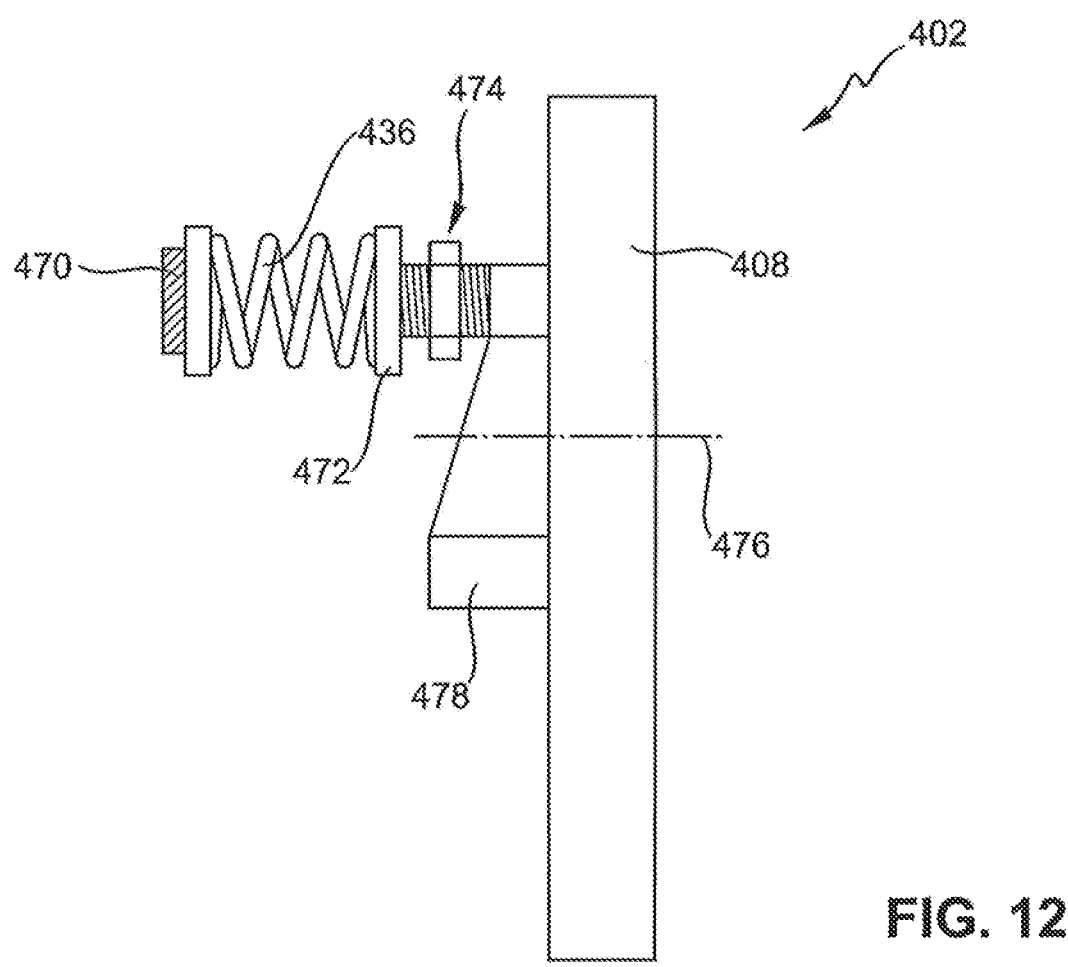
FIG. 12 shows a fourth exemplary embodiment of an actuator according to the invention in a partial axial section.

A further alternative embodiment of this system for storing and delivering energy is illustrated in FIG. 12. An axial track 478 is attached to the cam disc 408. This axial track 478 extends in an axial direction on one side of the cam disc 408 and has different axial extents. A roller bearing 474, which acts on a spring element 436 via a spring head 472, is in contact with the axial track 478. The spring element 436 is mounted fixedly by means of a bearing 470.

When the cam disc 408 rotates, the roller bearing 474 follows the axial track 478 in the axial direction. If the roller bearing 474 thus moves in the direction of the bearing 470, the spring element 436 arranged between the bearing 470 and the spring head 472 is compressed and therefore energy is stored therein.

If, in contrast, the roller bearing 474 moves on such a section of the axial track 478 where the roller bearing 474 moves in the direction of the cam disc 408, the spring element 436 assists the rotational movement of the cam disc 408 and therefore delivers its stored energy to the latter. It should be understood that the axial track 478 can in principle be positioned on both sides of the cam disc 408.

Figure 13:
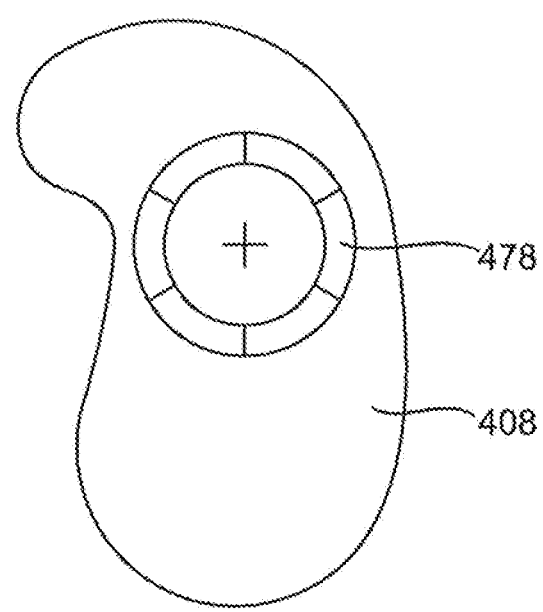
FIG. 13 shows the exemplary embodiment of the actuator according to the invention according to FIG. 12 in a plan view of the cam disc.

A plan view of such a cam disc 408 provided with an axial track 478 is illustrated in FIG. 13. The axial track 478 is here arranged centered about the axis of rotation of the cam disc 408.

Figure 14:
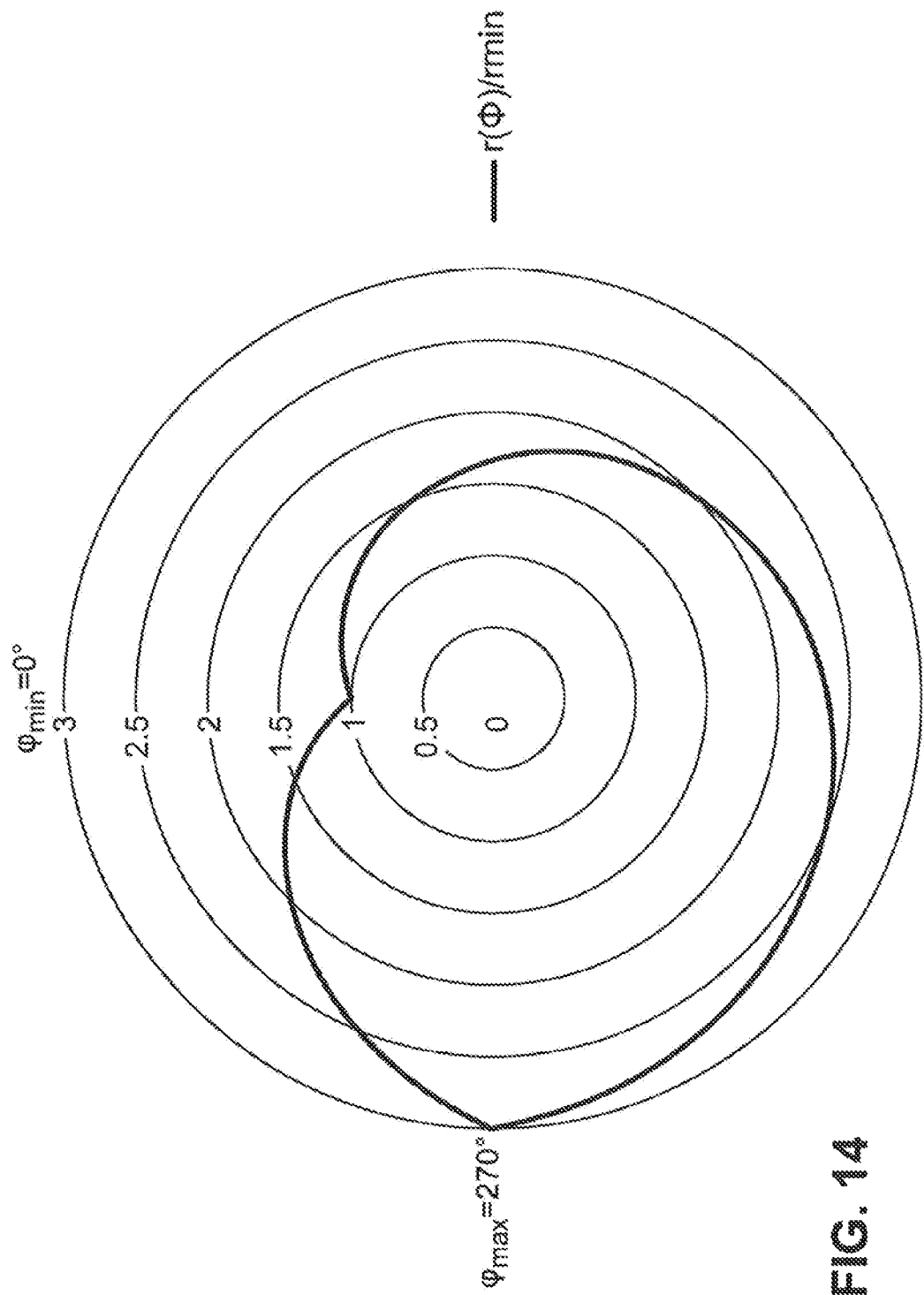
FIG. 14 shows a diagram of the function $r(\varphi)$ of the radial distance of the contact surface according to a first exemplary embodiment of a cam disc according to the invention in polar coordinates.
Figure 15:
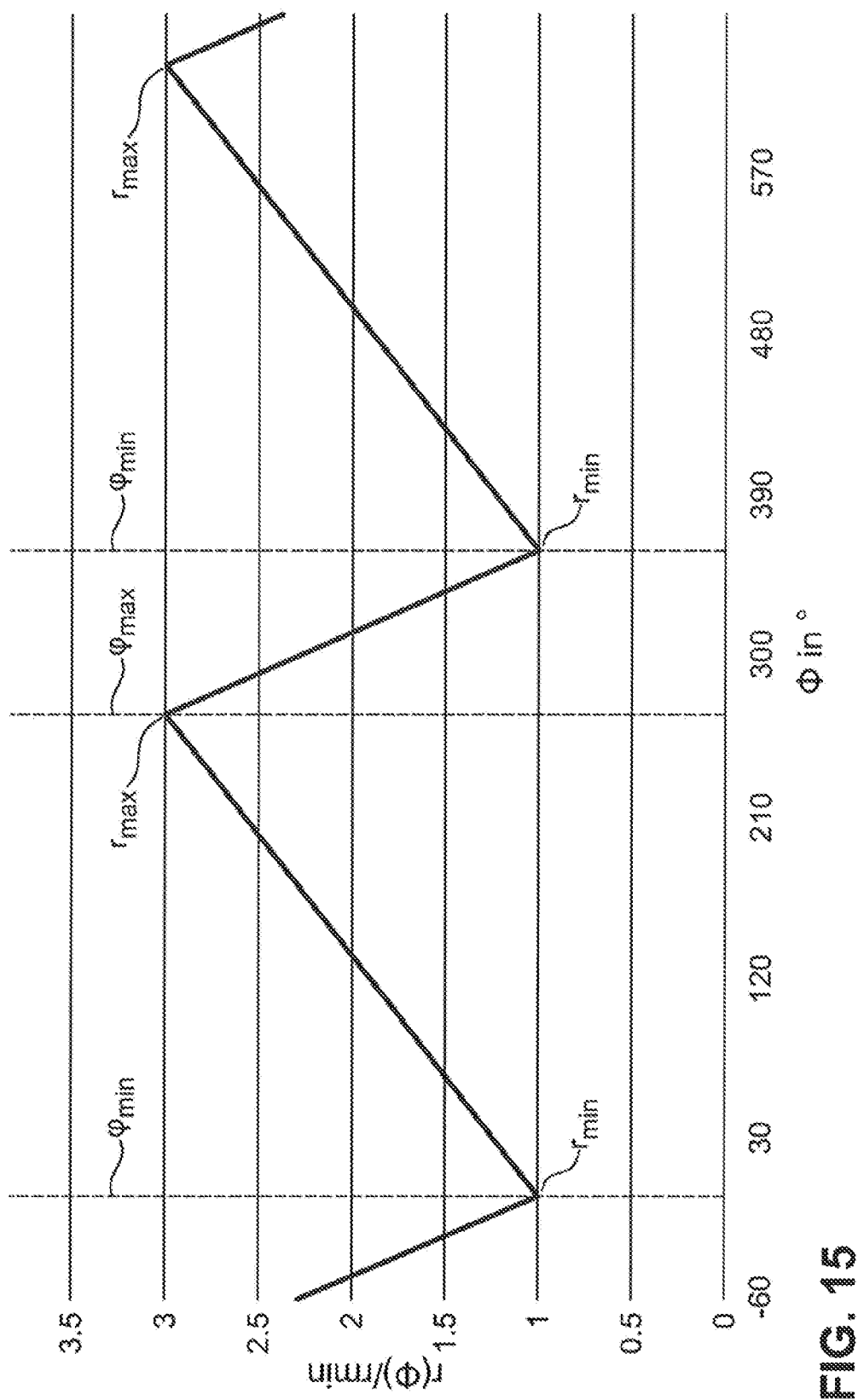
FIG. 15 shows a diagram of the function $r(\varphi)$ of the radial distance of the contact surface according to the first exemplary embodiment of the cam disc according to the invention in Cartesian coordinates.

FIGS. 14 and 15 show diagrams of the function $r(\varphi)$ according to a first exemplary embodiment (FIGS. 1-13) of the cam disc according to the invention.

FIG. 14 shows the function $r(\varphi)$ in polar coordinates beginning from an angular position $\varphi=\varphi_{min}$ which in the present exemplary embodiment corresponds to an angular position of 0°.

It is understood that if, for example, $\varphi_{min}=0$, it is also true that $\varphi_{min}=360°$ because the rotation of the cam disc would start again once 360° has been exceeded. The angular positions and radii shown are given only by way of example and can be adapted or shifted as desired.

The function $r(\varphi)$ rises strictly monotonically in a first angular range $0°\leq\varphi\leq270°$ and falls strictly monotonically in a second angular range $270°\leq\varphi\leq360°$.

Figure 16:
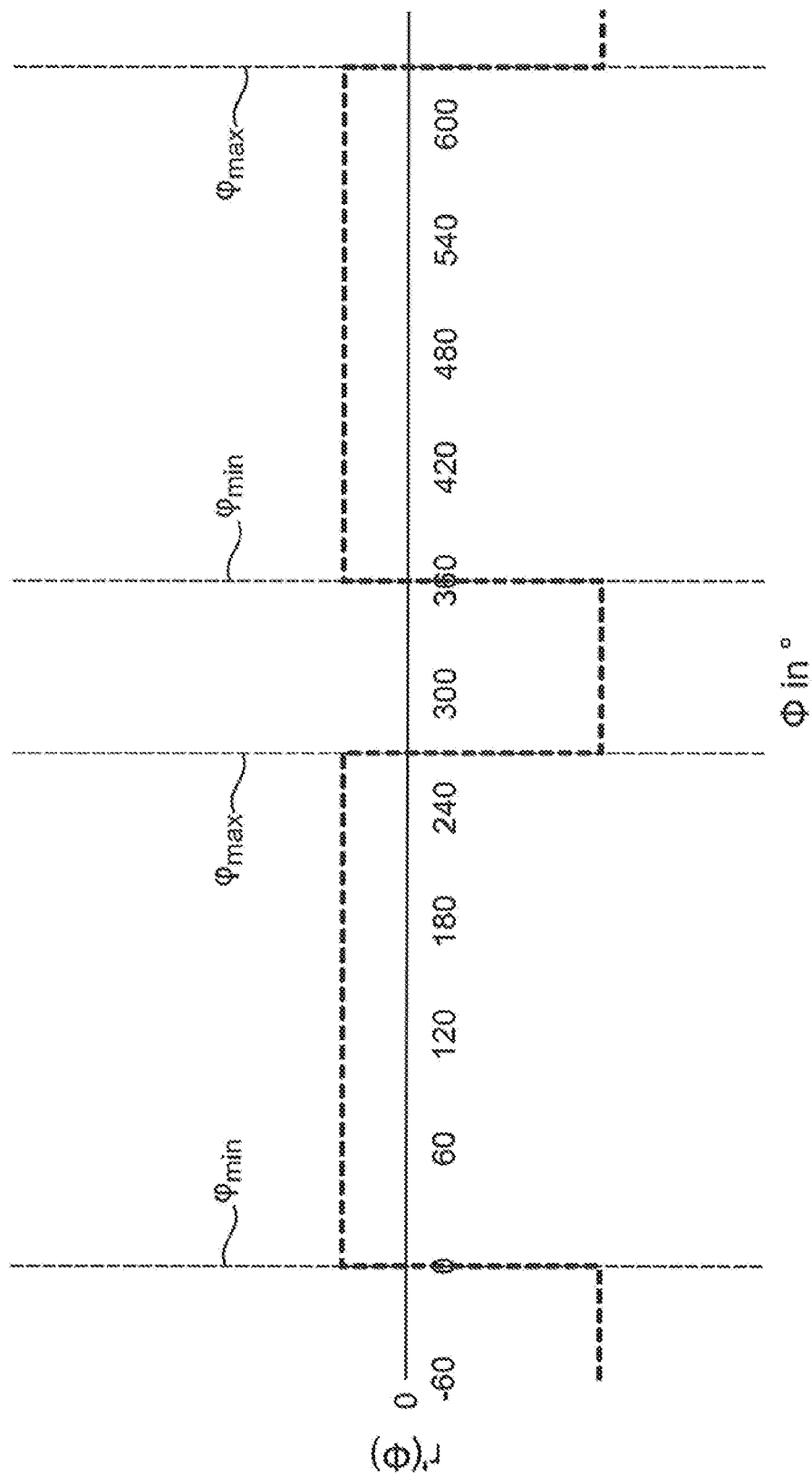
FIG. 16 shows a diagram of the function $r'(\varphi)$ of the rate of change of the radial distance of the contact surface according to the first exemplary embodiment of the cam disc according to the invention in Cartesian coordinates.

The function $r(\varphi)$ has, as shown in particular in FIG. 16, a positive rate of change $r'(\varphi)$ in the first angular range. Subsequently, the radial distance $r(\varphi)$ increases constantly in the angular range $0\leq\varphi\leq270°$. As shown in particular in FIG. 15, the radial distance $r(\varphi)$ increases in particular linearly in this angular range.

The radial distance $r(\varphi)$ decreases strictly monotonically in the angular range $270°\leq\varphi\leq360°$ such that the rate of change $r'(\varphi)$ in this range is negative, as also shown in particular in FIG. 16. As shown in particular in FIG. 15, the radial distance in this angular range decreases linearly.

As the function profile of the rate of change $r'(\varphi)$ according to FIG. 16 shows, the rate of change is smooth in an angular range $0\leq\varphi\leq270°$, such that the radial distance $r(\varphi)$ changes linearly. $r'(\varphi)>0$ in this angular range such that the radial distance $r(\varphi)$ increases until the radial distance assumes a maximum value at the angular position $\varphi=270°$. At this angular position, a sudden switch in the rate of change, which is not smooth at this point, takes place and it switches from a positive slope with $r'(\varphi)\geq0$ to a negative slope with $r'(\varphi)\leq0$. At this point, the contact surface of the cam disc consequently has a kink.

Figure 17:
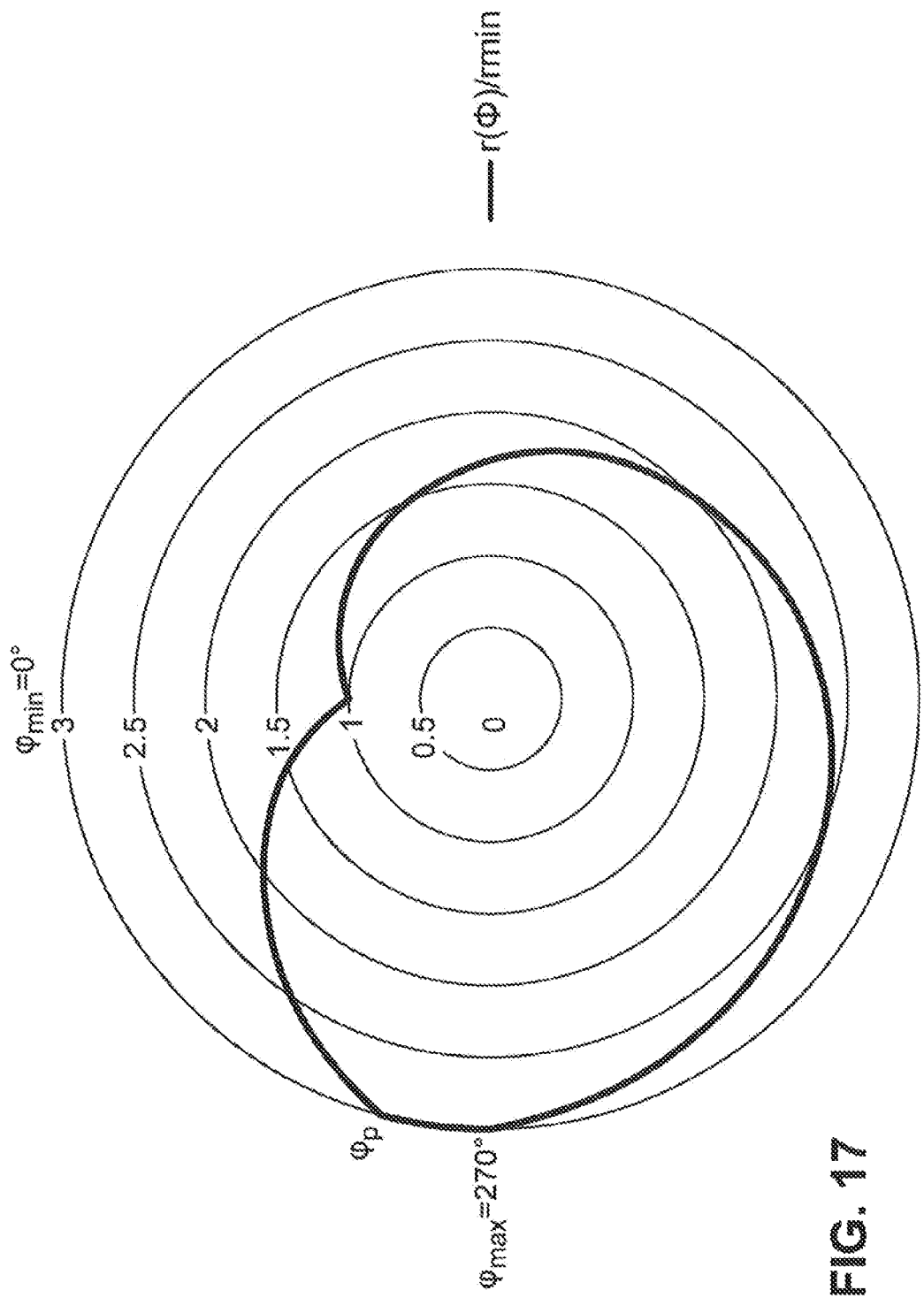
FIG. 17 shows a diagram of the function $r(\varphi)$ of the radial distance of the contact surface according to a second exemplary embodiment of a cam disc according to the invention in polar coordinates.
Figure 18:
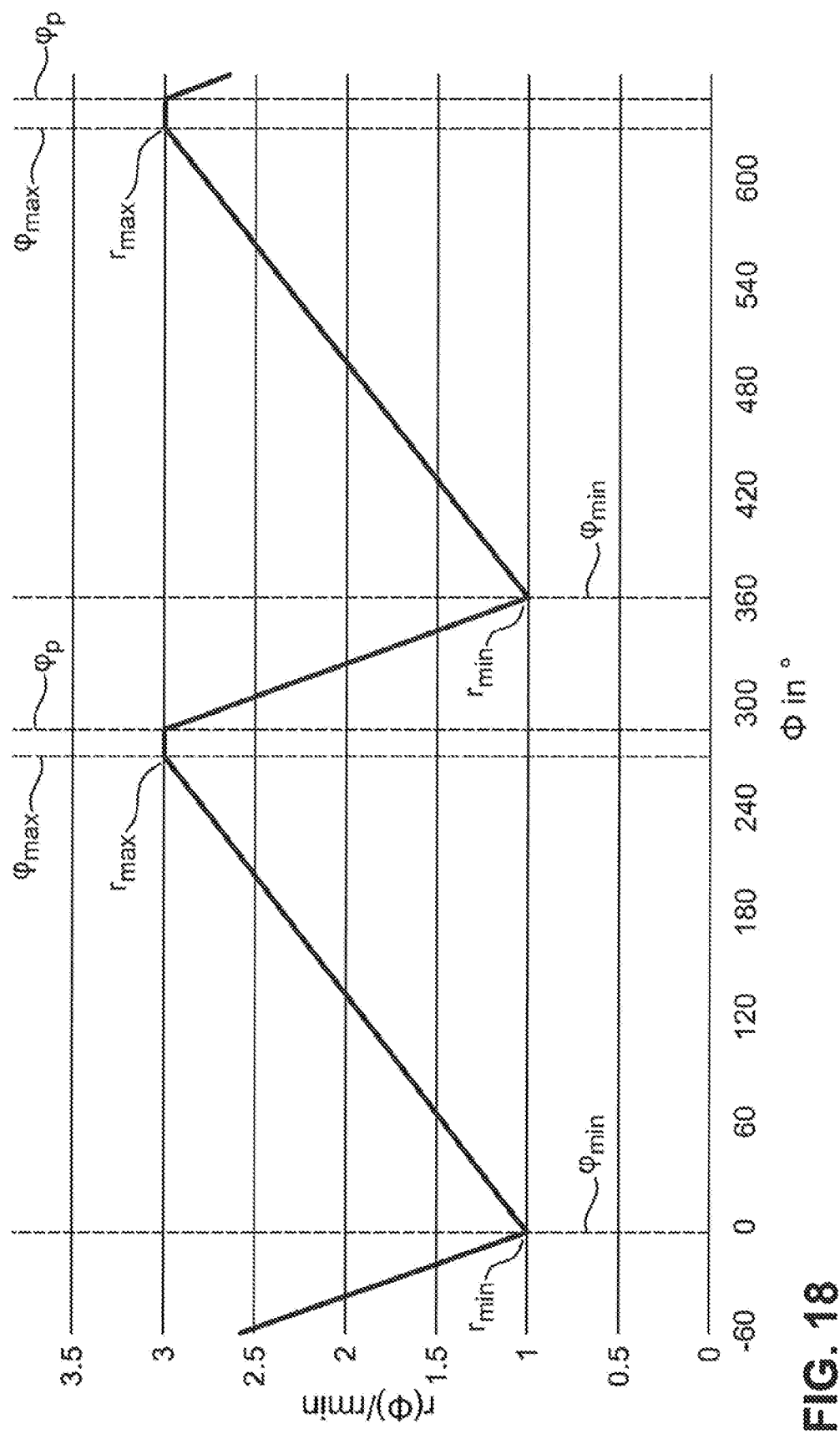
FIG. 18 shows a diagram of the function $r(\varphi)$ of the radial distance of the contact surface according to a second exemplary embodiment of the cam disc according to the invention in Cartesian coordinates.
Figure 19:
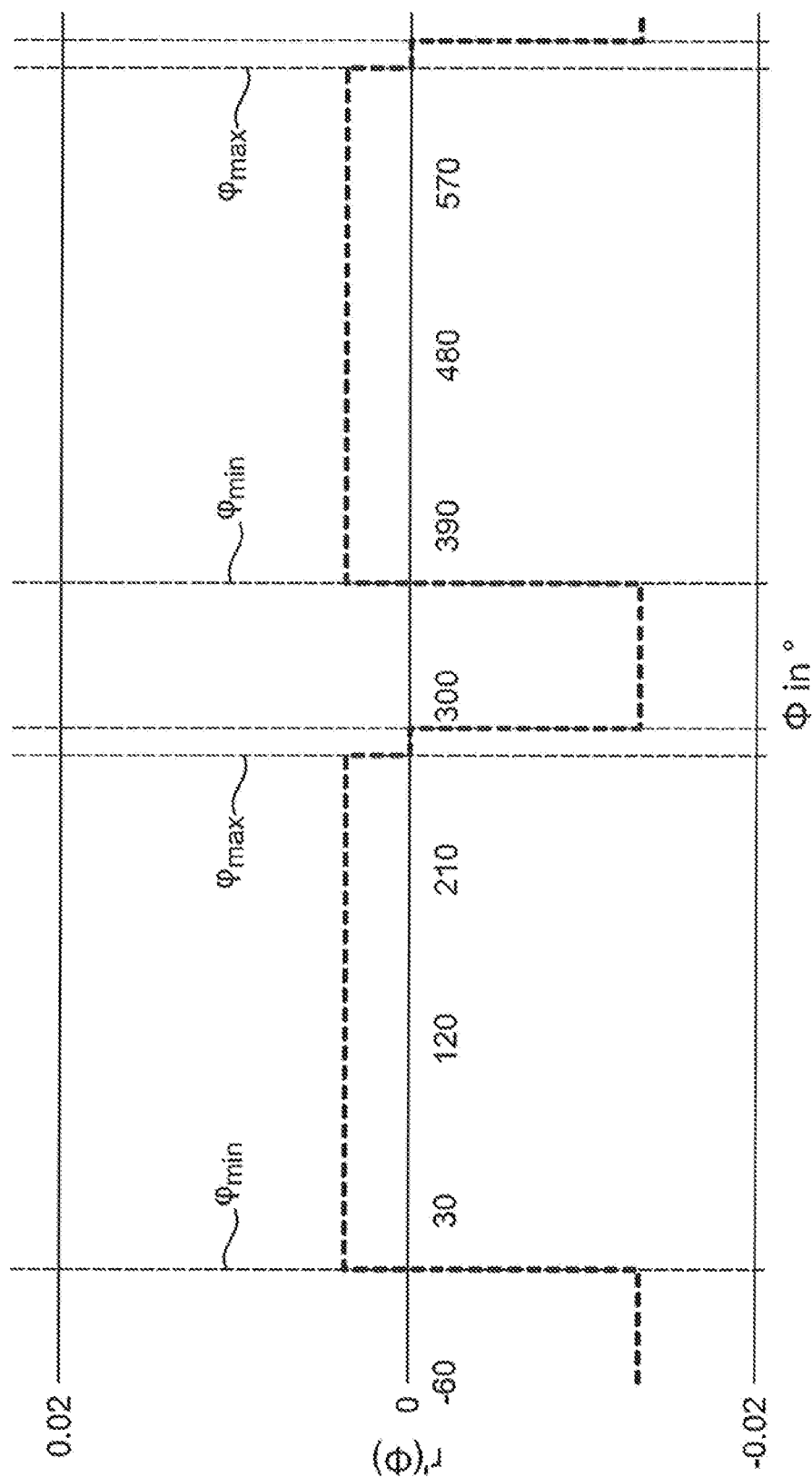
FIG. 19 shows a diagram of the function $r'(\varphi)$ of the rate of change of the radial distance of the contact surface according to the second exemplary embodiment of the cam disc according to the invention in Cartesian coordinates.

FIGS. 17 and 18 show diagrams of the function $r(\varphi)$ according to a second exemplary embodiment of the cam disc according to the invention in polar coordinates and Cartesian coordinates, respectively. FIG. 19 moreover shows a diagram of the function $r'(\varphi)$ of the rate of change of the radial distance of the contact surface according to the second exemplary embodiment of the cam disc according to the invention in Cartesian coordinates.

The function $r(\varphi)$ according to the second exemplary embodiment differs from the function shown in FIGS. 14 and 15 by an angular range $\varphi_{max}\leq\varphi\leq\varphi_p$ in which the radial distance $r(\varphi)$ is constant. This range follows the angular position $\varphi_{max}$ such that the maximum radial distance $r_{max}$ in this range is constant and forms a kind of tolerance range. The radial distance $r(\varphi)$ is at its maximum in this tolerance range such that the plunger is held in the maximum deflected position and a constant braking force continues to be exerted on the brake disc even in the event of over-rotation of the cam disc.

As shown in particular in FIG. 19, the rate of change $r'(\varphi)$ in an angular range $0\leq\varphi\leq270°$ is positive and falls suddenly at an angular position $\varphi=270°$ to a rate of change of $r'(\varphi)=0$. In this range, the radial distance $r(\varphi)$ consequently does not change. Following this tolerance range, the rate of change $r'(\varphi)$ falls suddenly such that the rate of change $r'(\varphi)$ is negative and in particular constant and the radial distance $r(\varphi)$ in this angular range falls linearly.

Figure 20:
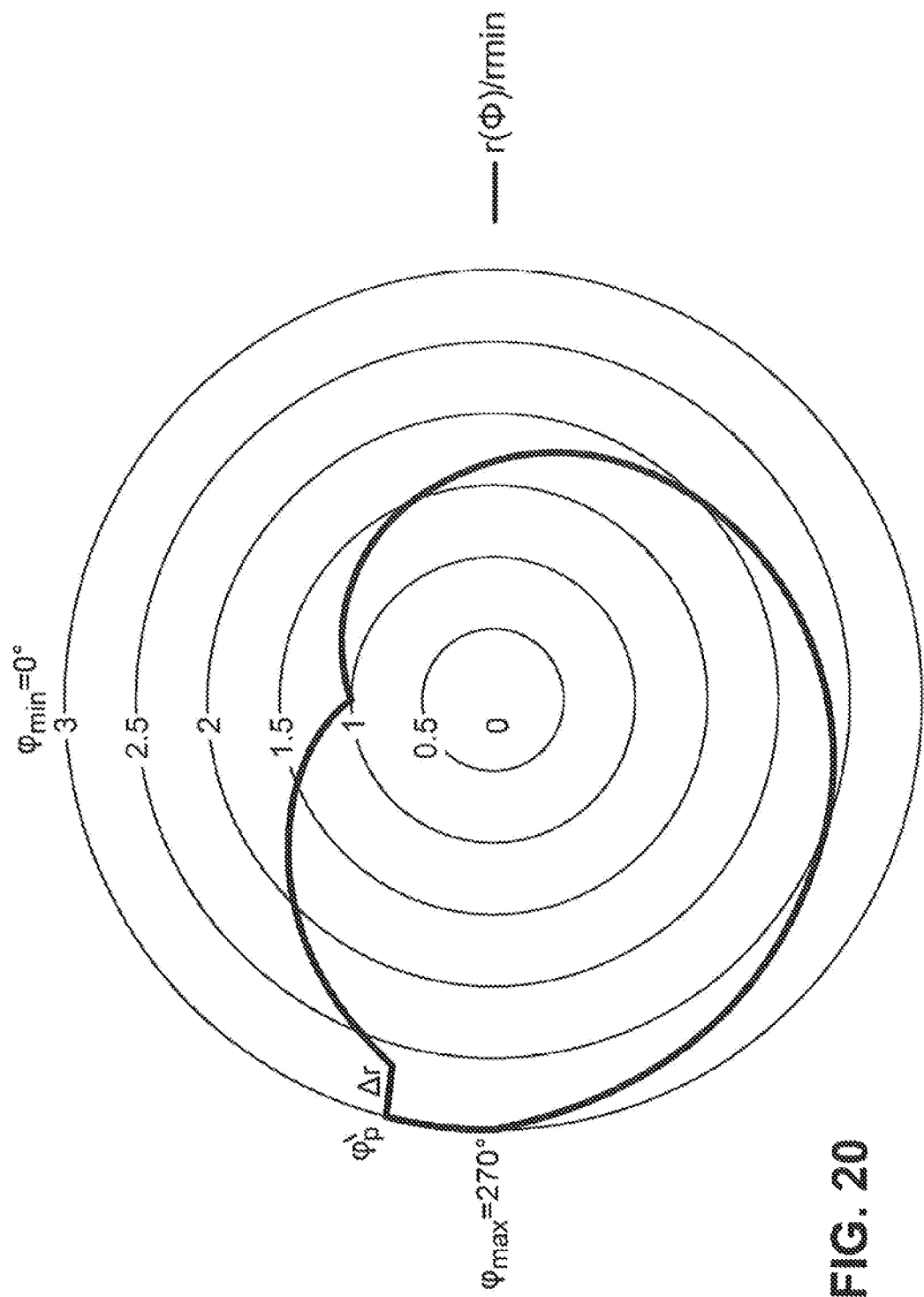
FIG. 20 shows a diagram of the function $r(\varphi)$ of the radial distance of the contact surface according to a third exemplary embodiment of a cam disc according to the invention in polar coordinates.
Figure 21:
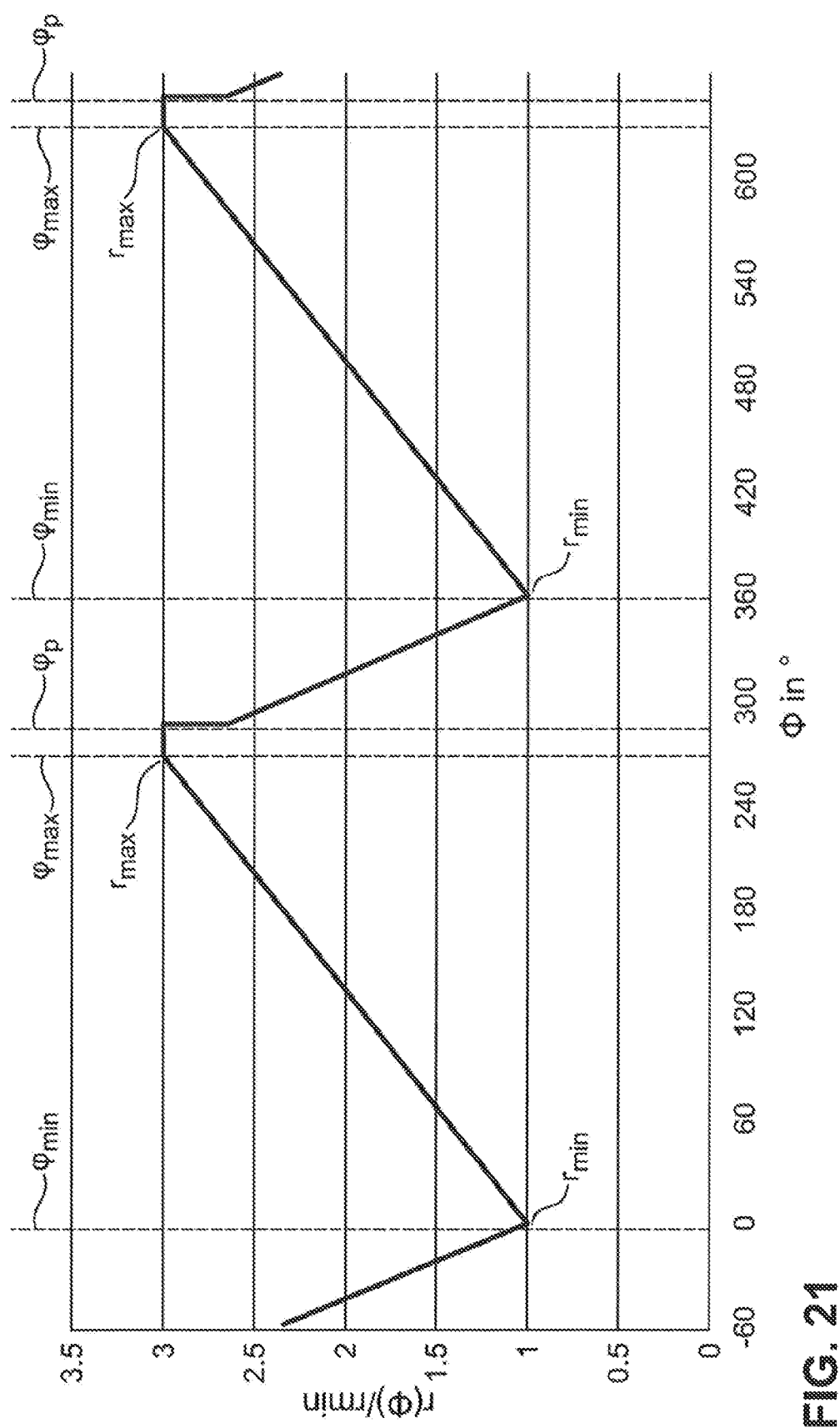
FIG. 21 shows a diagram of the function $r(\varphi)$ of the radial distance of the contact surface according to the third exemplary embodiment of the cam disc according to the invention in Cartesian coordinates.
Figure 22:
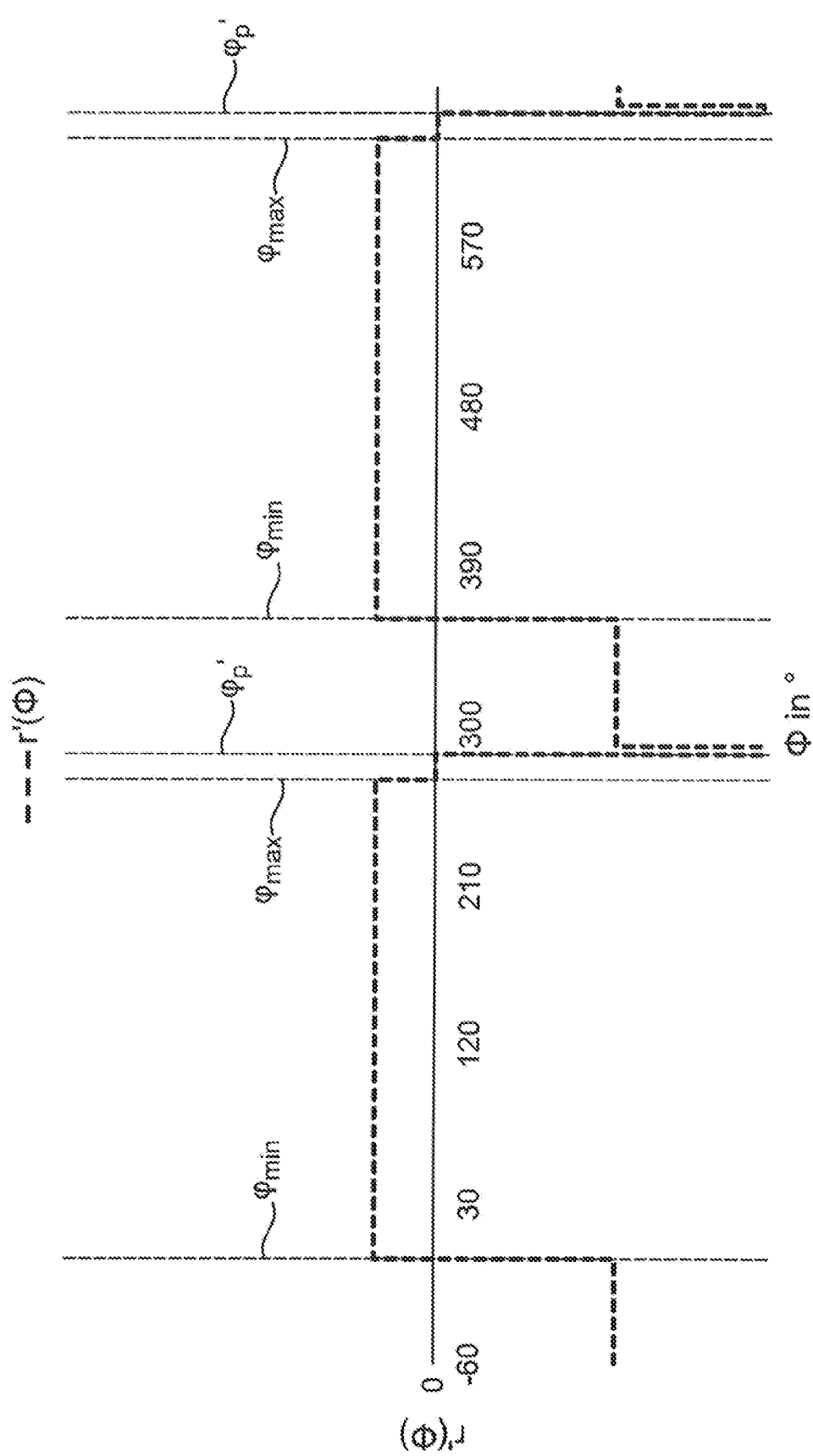
FIG. 22 shows a diagram of the function $r'(\varphi)$ of the rate of change of the radial distance of the contact surface according to the third exemplary embodiment of the cam disc according to the invention in Cartesian coordinates.

FIGS. 20 and 21 show diagrams of the function $r(\varphi)$ according to a second exemplary embodiment of the cam disc according to the invention in polar coordinates and Cartesian coordinates, respectively. FIG. 22 moreover shows a diagram of the function $r'(\varphi)$ of the rate of change of the radial distance of the contact surface according to the second exemplary embodiment of the cam disc according to the invention in Cartesian coordinates.

The function $r(\varphi)$ according to the third exemplary embodiment differs from the function shown in FIGS. 14 and 15 by an angular range $\varphi_{max}\leq\varphi\leq\varphi_p'$ in which the radial distance $r(\varphi)$ is constant and a sudden change in the radial distance $r(\varphi)$ at the angular position $\varphi=\varphi_p'$. At this angular position, the radial distance $r(\varphi)$ falls suddenly by a value $$\Delta r \leq \frac{1}{10} r(\varphi_{max}).$$

wherein this jump is not shown to scale in FIGS. 20 and 21 which only illustrate an exemplary jump Or. The stored energy can be dissipated quickly and efficiently by such a predefined jump, wherein the load on the brake actuator is relatively low. The process time which is required to return the brake plunger to its starting position is thus reduced.

As shown in particular in FIG. 2, the rate of change $r'(\varphi)$ drops suddenly at the angular position and then rises again suddenly to a value $r'(\varphi)\leq0$. The rate of change $r'(\varphi)$ is then smooth and in particular constant again in an angular range $\varphi>\varphi_p'$ such that the radial distance $r(\varphi)$ decreases linearly in an angular range $\varphi_p'\leq\varphi\leq360°$.

Figure 23:
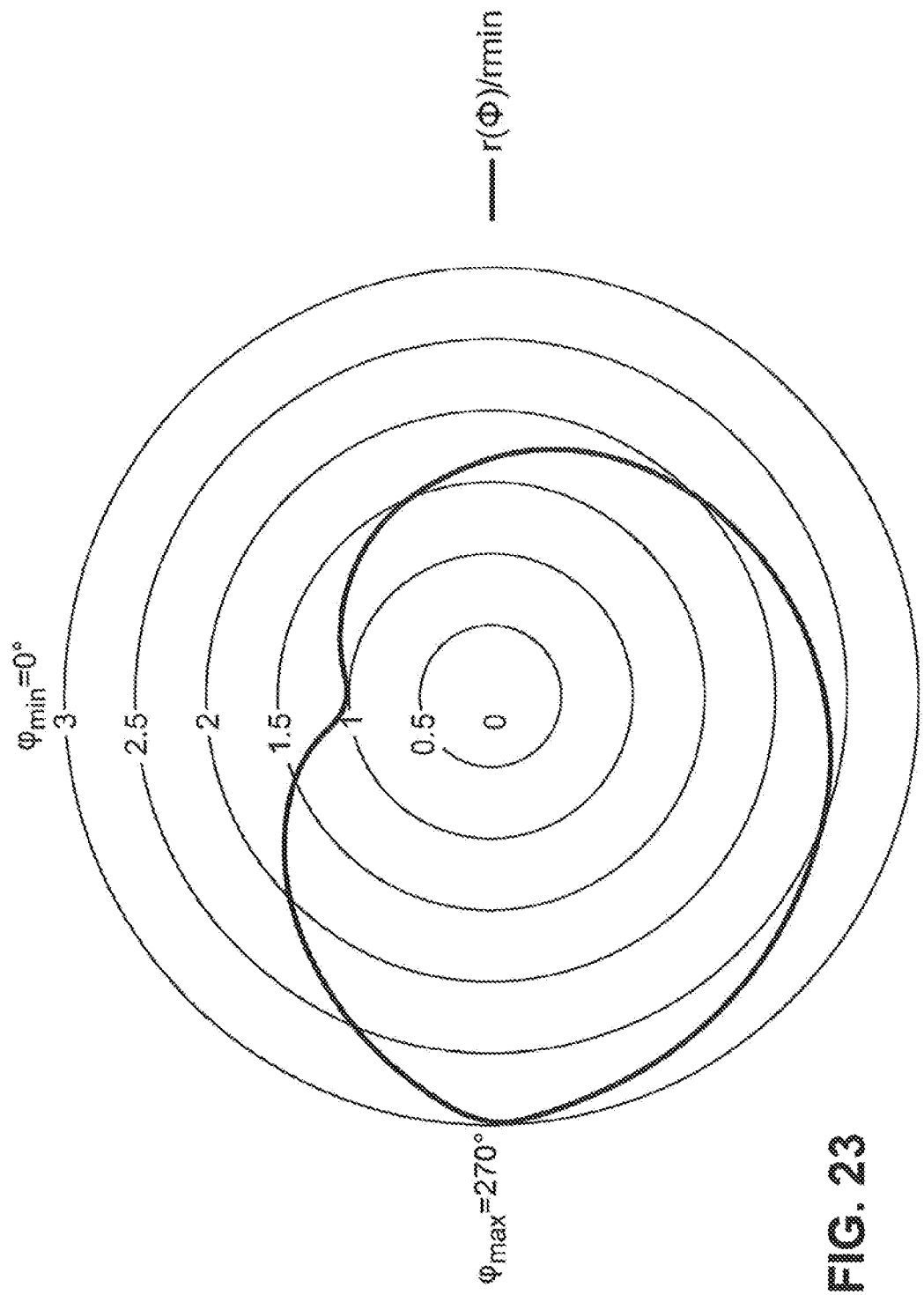
FIG. 23 shows a diagram of the function $r(\varphi)$ of the radial distance of the contact surface according to a fourth exemplary embodiment of a cam disc according to the invention in polar coordinates.
Figure 24:
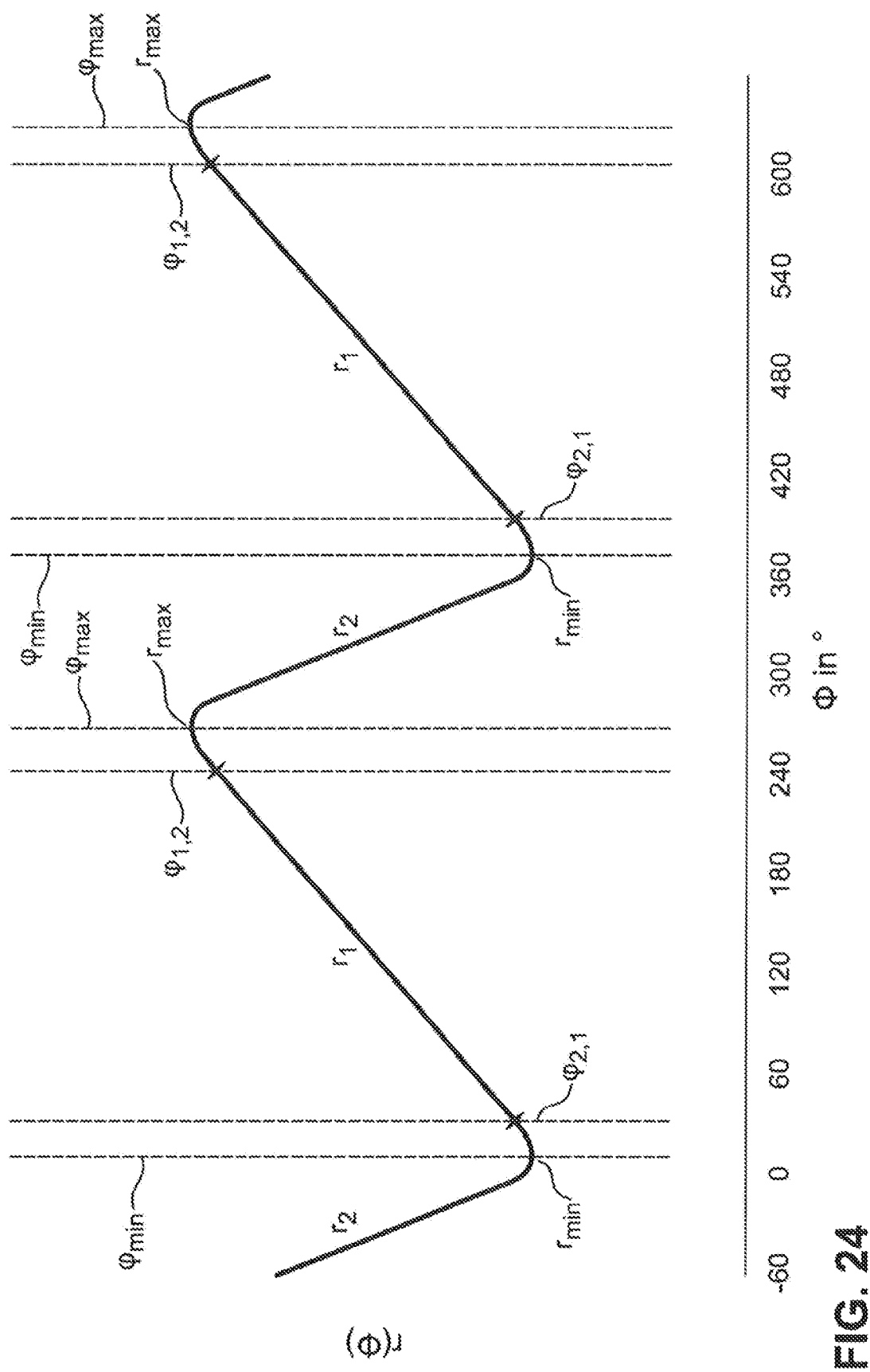
FIG. 24 shows a diagram of the function $r(\varphi)$ of the radial distance of the contact surface according to the fourth exemplary embodiment of the cam disc according to the invention in Cartesian coordinates.
Figure 25:
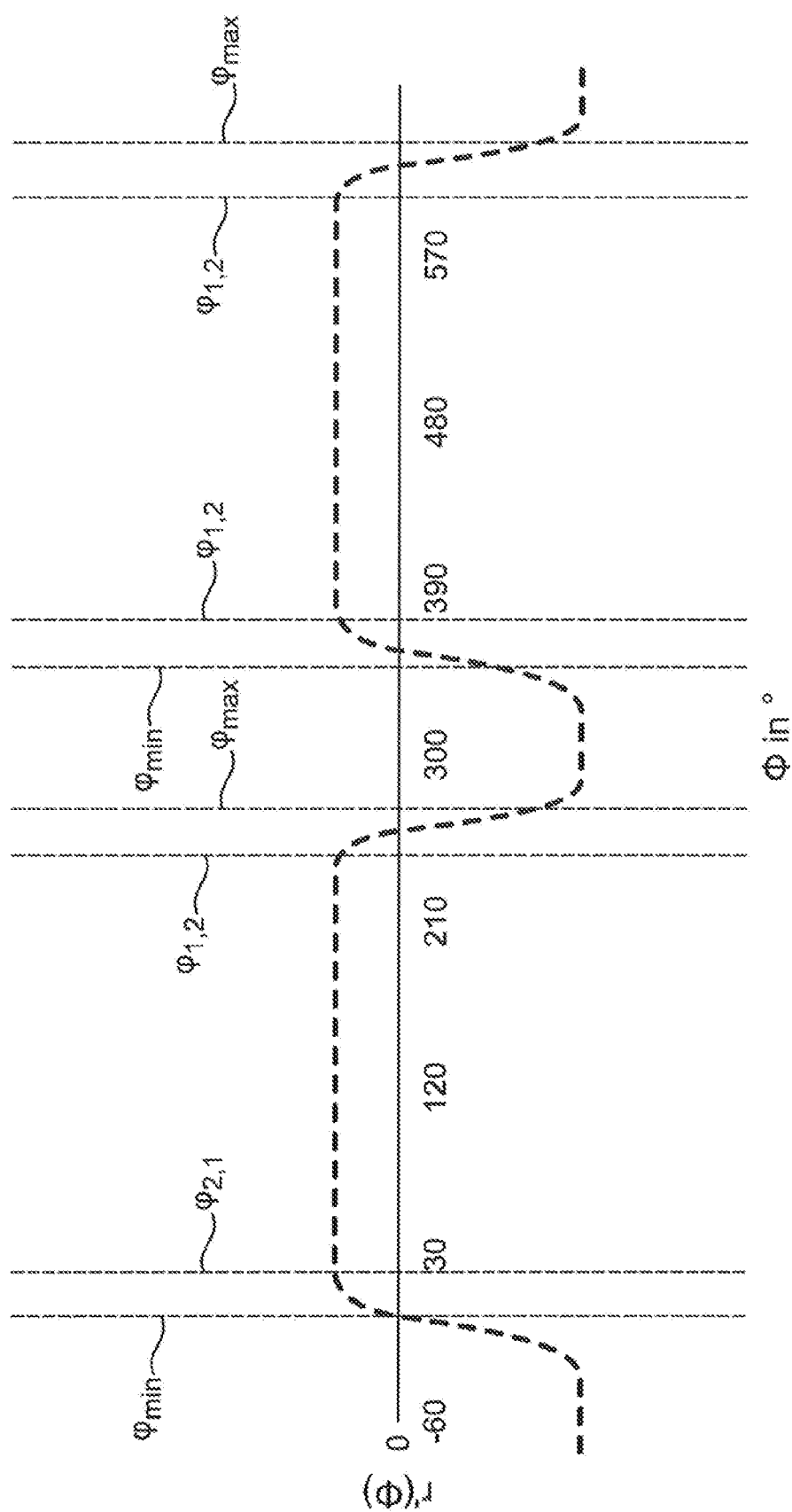
FIG. 25 shows a diagram of the function $r'(\varphi)$ of the rate of change of the radial distance of the contact surface according to the fourth exemplary embodiment of the cam disc according to the invention in Cartesian coordinates.

FIGS. 23 and 24 show diagrams of the function $r(\varphi)$ according to a fourth exemplary embodiment of the cam disc according to the invention in polar coordinates and Cartesian coordinates, respectively. FIG. 25 moreover shows a diagram of the function $r'(\varphi)$ of the rate of change of the radial distance of the contact surface according to the fourth exemplary embodiment of the cam disc according to the invention in Cartesian coordinates.

The function $r(\varphi)$ according to the fourth exemplary embodiment differs from the function shown in FIGS. 14 and 15 by a smooth profile of the rate of change $r'(\varphi)$. The function profiles $r_1(\varphi)$ and $r_2(\varphi)$ meet at an angular position $\varphi=\varphi_{p1,2}$ at which $r'_1(\varphi_{p1,2})=r'_2(\varphi_{p1,2})$ and at an angular position $\varphi=\varphi_{p2,1}$ at which $r'_2(\varphi_{p2,1})=r'_1(\varphi_{p2,1})$. The function profiles $r_1(\varphi)$ and $r_2(\varphi)$ thus meet with no kinks such that the plunger slides or rolls smoothly on the contact surface of the cam disc and does not experience any vibration.

The first angular position $\varphi=\varphi_{p1,2}$ here describes an angular position which follows the angular position $\varphi=\varphi_{max}$ at which the radial distance $r(\varphi)$ is at its maximum. The second angular position $\varphi_{p2,1}$ follows the angular position $\varphi=\varphi_{min}$ at which the radial distance is at its minimum. The region of the cam disc in which the radial distance $r_2(\varphi)$ of the contact surface from the pivot point of the plunger decreases thus merges smoothly and in particular with no kinks into the region of the cam disc in which the radial distance $r_1(\varphi)$ increases in particular linearly.

As shown in particular in FIG. 25, r'(φ) is smooth in the whole angular range.

Figure 26:
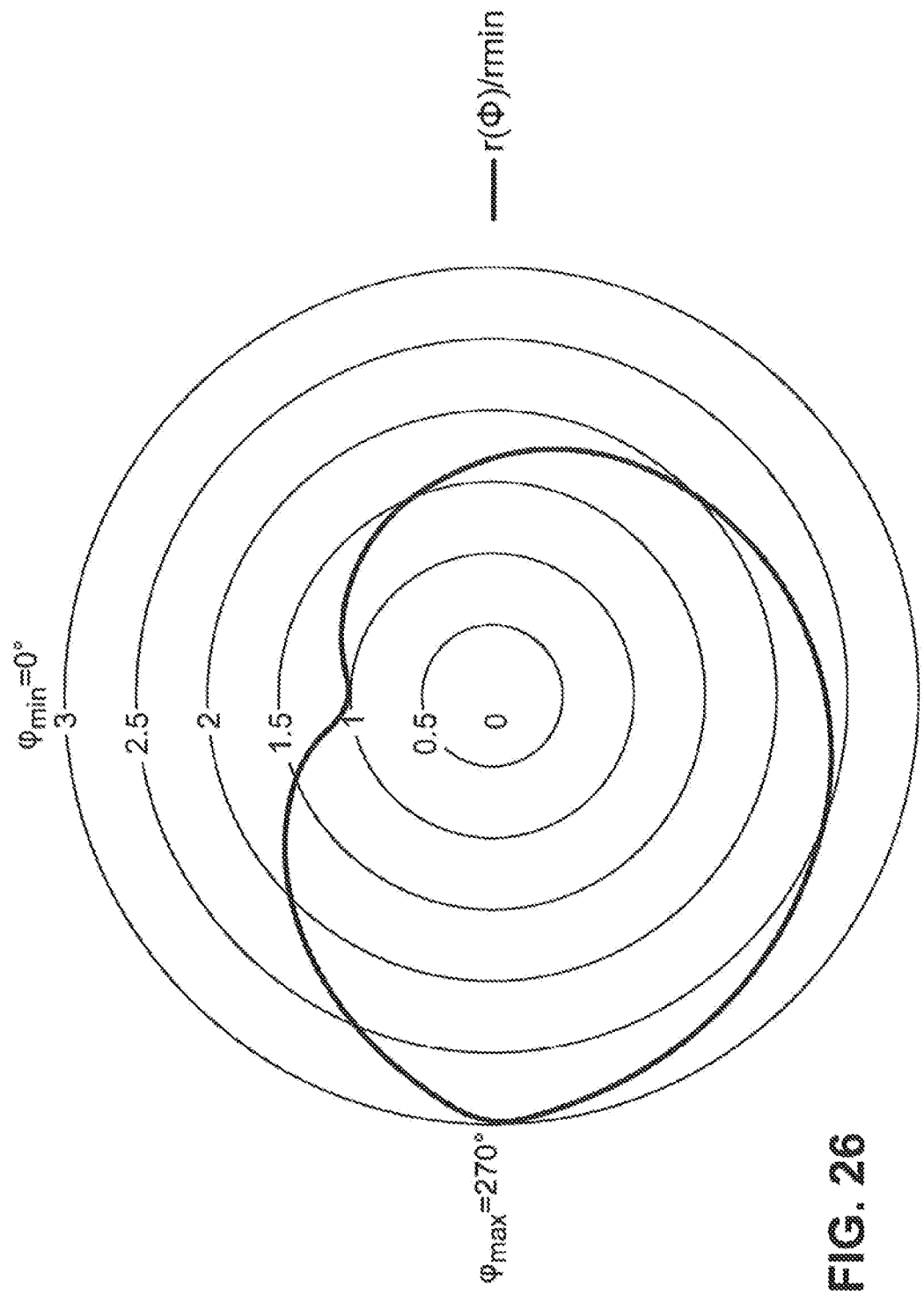
FIG. 26 shows a diagram of the function $r(\varphi)$ of the radial distance of the contact surface according to a fifth exemplary embodiment of a cam disc according to the invention in polar coordinates.
Figure 27:
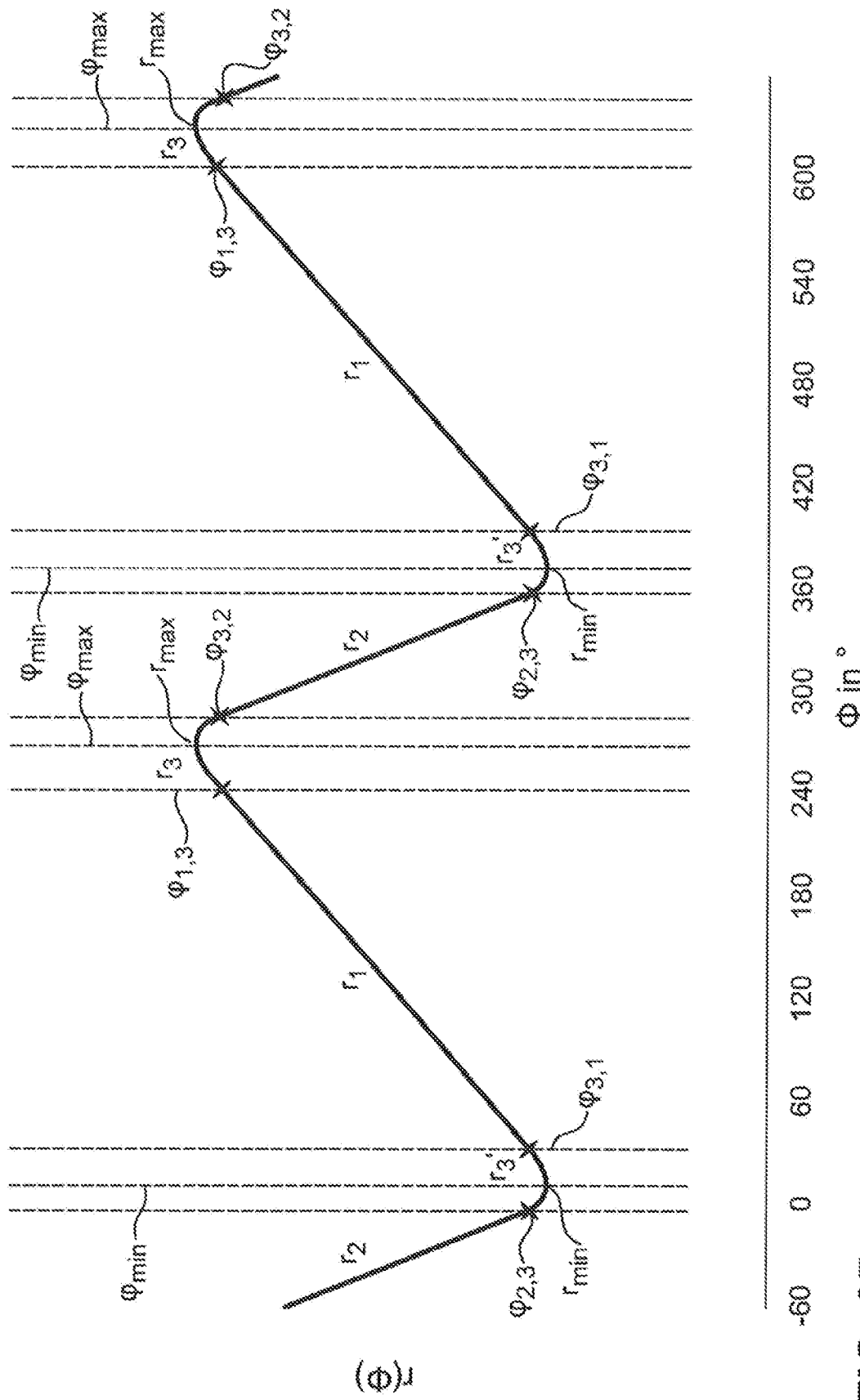
FIG. 27 shows a diagram of the function $r(\varphi)$ of the radial distance of the contact surface according to the fifth exemplary embodiment of the cam disc according to the invention in Cartesian coordinates.
Figure 28:
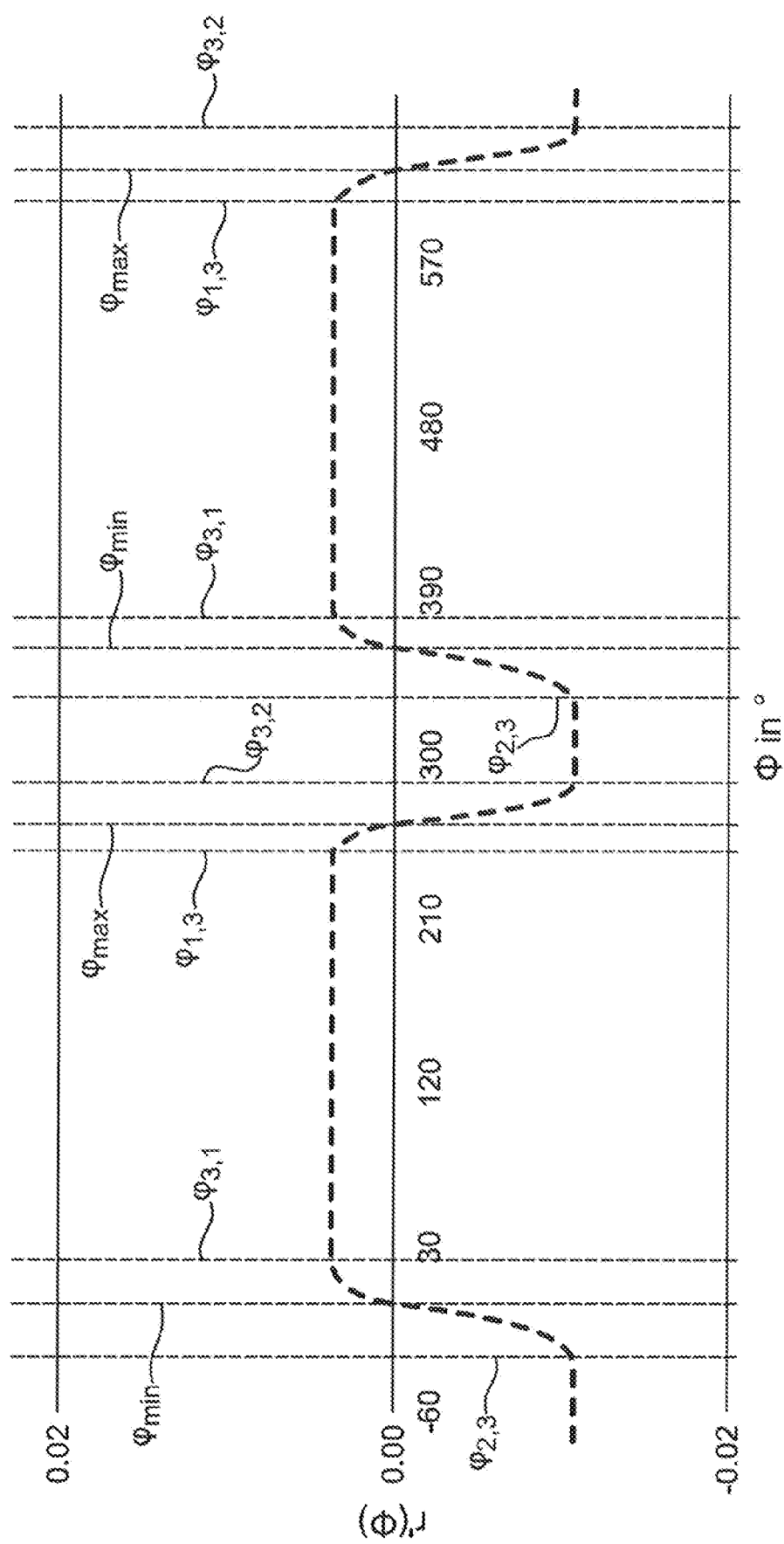
FIG. 28 shows a diagram of the function $r'(\varphi)$ of the rate of change of the radial distance of the contact surface according to the fifth exemplary embodiment of the cam disc according to the invention in Cartesian coordinates.

FIGS. 26 and 27 show diagrams of the function r(v) according to a fifth exemplary embodiment of the cam disc according to the invention in polar coordinates and Cartesian coordinates, respectively. FIG. 28 moreover shows a diagram of the function r'(φ) of the rate of change of the radial distance of the contact surface according to the fifth exemplary embodiment of the cam disc according to the invention in Cartesian coordinates.

The function r(v) according to a fifth exemplary embodiment differs from the function shown in FIGS. 14 and 15 in that, at an angular position $\varphi_{1,3} < \varphi_{max}$ the first function profile $r_1(\varphi)$ meets a transition function $r_3(\varphi)$, wherein the transition runs smoothly and in particular with no kinks. $r'_1(\varphi_{1,3}) = r'_3(\varphi_{1,3})$ applies at such a transition with no kinks. The second function profile $r_2(\varphi)$ moreover meets the transition function $r_3(\varphi)$ at a second angular position $\varphi_{3,2} > \varphi_{max}$ smoothly and likewise with no kinks such that $r'_2(\varphi_{3,2}) = r'_3(\varphi_{3,2})$ moreover applies. A second transition function $r_3(\varphi)'$ preferably moreover meets the second function profile $r_2(\varphi)$ at a third angular position $\varphi_{max} < \varphi_{2,3} < 360°$, wherein the transition runs smoothly and in particular with no kinks. At such a transition with no kinks, $r'_2(\varphi_{2,3}) = r'_3(\varphi_{2,3})$. At a fourth angular position $\varphi_{3,1} > \varphi_{min}$, the second transition function $r_3(\varphi)'$ meets the function profile $r_1(\varphi)$, wherein the transition runs smoothly and in particular with no kinks. At such a transition with no kinks, $r'_1(\varphi_{3,1}) = r'_3(\varphi_{3,1})$.

Such a transition function enables a smooth function profile of the rate of change of r'(φ) according to FIG. 28.

What is claimed is:

1. An electromechanical brake actuator (102, 202, 302, 402) for a brake, in particular a commercial vehicle disc brake, having:
   an electric motor (106, 206) for generating a driving torque,
   a cam disc (108, 108', 108", 208, 308, 408) which is rotatably mounted and operatively connected to the electric motor (106, 206), and
   a brake plunger (114, 214, 314) configured to move along a plunger axis, for actuating a brake lever (358) of the brake (368),
   wherein the cam disc (108, 108', 108", 208, 308, 408) and the brake plunger (114, 214, 314) have contact surfaces which bear against each other and slide or roll on each other for directly transmitting the driving torque from the cam disc (108, 108', 108", 208, 308, 408) to the brake plunger (114, 214, 314),
   wherein the contact surface of the cam disc (108, 108', 108", 208, 308, 408) extends about a pivot point D at a radial distance r defined as a function r(φ) with a rate of change r'(φ) and dependent on an angular position φ of the cam disc (108, 108', 108", 208, 308, 408), and
   wherein the contact surface is configured in such a way that there is a non-linear transfer between the driving torque of the cam disc (108, 108', 108", 208, 308, 408) and the force transmitted to the brake plunger (114, 214, 314), wherein the radial distance r(φ) is at its minimum for an angular position where $\varphi = \varphi_{min}$ and is at its maximum for an angular position where $\varphi = \varphi_{max}$,
   wherein the rate of change r'(φ) is positive at least in certain regions in a first angular range $\varphi_{min} \leq \varphi \leq \varphi_{max}$, and in that the rate of change r'(φ) is negative at least in certain regions in a second angular range $\varphi_{max} \leq \varphi \leq 360°$,
   wherein, in the first angular range $\varphi_{min} \leq \varphi \leq \varphi_{max}$, the function r(φ) has a first function profile $r_1(\varphi)$, and, in the second angular range $\varphi_{max} \leq \varphi \leq 360°$, has a second function profile $r_2(\varphi)$ which differs from $r_1(\varphi)$.

2. The brake actuator (102, 202, 302, 402) as claimed in claim 1, wherein the rate of change is $r'(\varphi_{min}) = 0$ at an angular position where $\varphi = \varphi_{min}$.

3. The brake actuator (102, 202, 302, 402) as claimed in claim 2, wherein the function r(φ) has a positive curvature at an angular position where $\varphi = \varphi_{min}$ such that $r''(\varphi_{min}) > 0$.

4. The brake actuator (102, 202, 302, 402) as claimed in claim 1, wherein the rate of change is $r'(\varphi_{max}) = 0$ at an angular position where $\varphi = \varphi_{max}$.

5. The brake actuator (102, 202, 302, 402) as claimed in claim 1, wherein the function r(φ) has a negative curvature at an angular position where $\varphi = \varphi_{max}$ such that $r''(\varphi_{max}) < 0$.

6. The brake actuator (102, 202, 302, 402) as claimed claim 1, wherein the radial distance r(φ), at at least one angular position $\varphi = \varphi_p'$ with $\varphi_{max} \leq \varphi_p' \leq 360°$, changes suddenly by a value $$\Delta r \leq \frac{1}{10} r(\varphi_{max}).$$

7. The brake actuator (102, 202, 302, 402) as claimed in claim 1, wherein the radial distance r(φ) increases strictly monotonically in an angular range $\varphi_{min} \leq \varphi \leq \varphi_{max}$ such that $r'(\varphi_{min} \leq \varphi \leq \varphi_{max}) > 0$.

8. The brake actuator (102, 202, 302, 402) as claimed in claim 1, wherein the radial distance r(φ) decreases strictly monotonically in an angular range $\varphi_{max} \leq \varphi \leq 360°$ such that $r'(\varphi_{max} \leq \varphi \leq 360°) < 0$.

9. The brake actuator (102, 202, 302, 402) as claimed in claim 1, wherein $r_1(\varphi)$ and $r_2(\varphi)$ meet at at least one angular position $\varphi_{1,2}$ at which $r_1'(\varphi)$ and $r_2'(\varphi)$ are smooth.

10. The brake actuator (102, 202, 302, 402) as claimed in claim 9, wherein the angular position $\varphi_{1,2}$ is a first angular position at which $r_1(\varphi)$ has a negative curvature, and wherein $r_1(\varphi)$ and $r_2(\varphi)$ further meet at a second angular position $\varphi_{2,1}$ at which $r_2' = r_1'$ and $r_1(\varphi)$ has a positive curvature.

11. The brake actuator (102, 202, 302, 402) as claimed in claim 1, wherein $r_1(\varphi)$ and $r_2(\varphi)$ meet at at least one angular position $\varphi_{1,2}$ at which $r_1' = r_2'$.

12. The brake actuator (102, 202, 302, 402) as claimed in claim 11, wherein the angular position $\varphi_{1,2}$ is a first angular position at which $r_1(\varphi)$ has a negative curvature, and wherein $r_1(\varphi)$ and $r_2(\varphi)$ further meet at a second angular position $\varphi_{2,1}$ at which $r_2' = r_1'$ and $r_1(\varphi)$ has a positive curvature.

13. The brake actuator (102, 202, 302, 402) as claimed in claim 1, wherein the function r(φ) has a transition function $r_3(\varphi)$ which meets the first function profile $r_1(\varphi)$ at a first angular position $\varphi_{1,3}$, wherein $r_1'(\varphi_{1,3}) = r_3'(\varphi_{1,3})$, and which meets the second function profile $r_2(\varphi)$ at an angular position $\varphi_{3,2}$, wherein $r_2'(\varphi_{3,2}) = r_3'(\varphi_{3,2})$.

14. The brake actuator (102, 202, 302, 402) as claimed in claim 13, wherein the transition function $r_3(\varphi)$ is a first transition function, and the function r(φ) also has a second transition function $r_3(\varphi)$, which meets the first function profile $r_1(\varphi)$ at a third angular position $\varphi_{3,1}$, wherein $r_1'(\varphi_{3,1}) = r_3'(\varphi_{1,3})'$, and which meets the second function profile $r_2(\varphi)$ at an angular position $\varphi_{2,3}$, wherein $r_2'(\varphi_{2,3}) = r_3'(\varphi_{2,3})$.

15. The brake actuator (102, 202, 302, 402) as claimed in claim 1, wherein the rate of change is $r'(\varphi_{max} \leq \varphi < \varphi_p) = 0$ in an angular range $\varphi_{max} \leq \varphi < \varphi_p$, wherein $\varphi_{max} - \varphi_p \leq 0.1 \cdot (\varphi_{max} - \varphi_{min})°$.

16. A cam disc (108, 108', 108", 208, 308, 408) for a brake actuator (102, 202, 302, 402), the cam disc being configured to be connected to a driveshaft of an electric motor (106, 206), wherein the cam disc (108, 108', 108", 208, 308, 408) has a contact surface configured to bear against a contact surface of a brake plunger (114, 214, 314) for directly transmitting a driving torque between the cam disc (108, 108', 108", 208, 308, 408) and the brake plunger (114, 214, 314) in such a way that the contact surfaces slide or roll on each other, wherein the contact surface of the cam disc (108, 108', 108", 208, 308, 408) extends about a pivot point D at a radial distance r defined as a function $r(\varphi)$ with a rate of change $r'(\varphi)$ dependent on the angular position $\varphi$ of the cam disc (108, 108', 108", 208, 308, 408), and the contact surface is configured to effect a non-linear transfer between the driving torque of the cam disc (108, 108', 108", 208, 308, 408) and the force transmitted to the brake plunger (114, 214, 314), wherein the radial distance $r(\varphi)$ is at a minimum at an angular position where $\varphi=\varphi_{min}$ and is at a maximum at an angular position where $\varphi=\varphi_{max}$, wherein the rate of change $r'(\varphi)$ is positive at least in certain regions in a first angular range $\varphi_{min} \leq \varphi \leq \varphi_{max}$ and the rate of change $r'(\varphi)$ is negative at least in certain regions in a second angular range $\varphi_{max} \leq \varphi \leq 360°$, wherein, in the first angular range $\varphi_{min} \leq \varphi \leq \varphi_{max}$, the function $r(\varphi)$ has a first function profile $r_1(\varphi)$, and, in the second angular range $\varphi_{max} \leq \varphi \leq 360°$, has a second function profile $r_2(\varphi)$ which differs from $r_1(\varphi)$.

17. An electromechanical brake actuator (102, 202, 302, 402) for a brake, in particular a commercial vehicle disc brake, having:

an electric motor (106, 206) for generating a driving torque, a cam disc (108, 108', 108", 208, 308, 408) which is rotatably mounted and operatively connected to the electric motor (106, 206), and a brake plunger (114, 214, 314) configured to move along a plunger axis, for actuating a brake lever (358) of the brake (368), wherein the cam disc (108, 108', 108", 208, 308, 408) and the brake plunger (114, 214, 314) have contact surfaces which bear against each other and slide or roll on each other for directly transmitting the driving torque from the cam disc (108, 108', 108", 208, 308, 408) to the brake plunger (114, 214, 314), wherein the contact surface of the cam disc (108, 108', 108", 208, 308, 408) extends about a pivot point D at a radial distance r defined as a function $r(\varphi)$ with a rate of change $r'(\varphi)$ and dependent on an angular position $\varphi$ of the cam disc (108, 108', 108", 208, 308, 408), and wherein the contact surface is configured in such a way that there is a non-linear transfer between the driving torque of the cam disc (108, 108', 108", 208, 308, 408) and the force transmitted to the brake plunger (114, 214, 314), wherein the radial distance $r(\varphi)$ is at its minimum for an angular position where $\varphi=\varphi_{min}$ and is at its maximum for an angular position where $\varphi=\varphi_{max}$, wherein the rate of change $r'(\varphi)$ is positive at least in certain regions in a first angular range $\varphi_{min} \leq \varphi \leq \varphi_{max}$, and in that the rate of change $r'(\varphi)$ is negative at least in certain regions in a second angular range $\varphi_{max} \leq \varphi \leq 360°$, wherein the function $r(\varphi)$ has a transition function $r_3(\varphi)$ which meets the first function profile $r_1(\varphi)$ at a first angular position $\varphi_{1,3}$, wherein $r_1'(\varphi_{1,3})=r_3'(\varphi_{1,3})$, and which meets the second function profile $r_2(\varphi)$ at an angular position $\varphi_{3,2}$, wherein $r_2'(\varphi_{3,2})=r_3'(\varphi_{3,2})$.

18. The brake actuator (102, 202, 302, 402) as claimed in claim 17, wherein the transition function $r_3(\varphi)$ is a first transition function, and the function $r(\varphi)$ also has a second transition function $r_3(\varphi)'$, which meets the first function profile $r_1(\varphi)$ at a third angular position $\varphi_{3,1}$, wherein $r_1'(\varphi_{3,1})=r_3'(\varphi_{1,3})'$, and which meets the second function profile $r_2(\varphi)$ at an angular position $\varphi_{2,3}$, wherein $r_2'(\varphi_{2,3})=r_3'(\varphi_{2,3})$.

* * * * *